(12) United States Patent
Takla

(10) Patent No.: US 12,198,338 B2
(45) Date of Patent: Jan. 14, 2025

(54) AUTOMATED PLANT GROUPING AND TRACKING USING IMAGE DATA

(71) Applicant: iUNU, Inc., Seattle, WA (US)

(72) Inventor: Ethan Victor Takla, Seattle, WA (US)

(73) Assignee: iUNU, Inc., Seattle, WA (US)

( * ) Notice: Subject to any disclaimer, the term of this patent is extended or adjusted under 35 U.S.C. 154(b) by 349 days.

(21) Appl. No.: 17/717,016

(22) Filed: Apr. 8, 2022

(65) Prior Publication Data

US 2023/0326012 A1 Oct. 12, 2023

(51) Int. Cl.
G06T 7/00 (2017.01)
G06T 5/50 (2006.01)
G06V 10/20 (2022.01)
G06V 10/25 (2022.01)

(52) U.S. Cl.
CPC .............. G06T 7/0012 (2013.01); G06T 5/50 (2013.01); G06V 10/25 (2022.01); G06V 10/255 (2022.01); G06T 2207/20212 (2013.01); G06T 2207/30188 (2013.01)

(58) Field of Classification Search
CPC ...................... G06T 7/0012; G06T 5/50; G06T 2207/20212; G06T 2207/30188; G06V 10/25; G06V 10/255
See application file for complete search history.

(56) References Cited

U.S. PATENT DOCUMENTS

| | | | | |
|---|---|---|---|---|
| 6,594,621 | B1 * | 7/2003 | Meeker | G05B 23/0283 |
| | | | | 702/183 |
| 10,225,993 | B2 * | 3/2019 | Alexander | G05D 1/0287 |
| 10,440,900 | B1 * | 10/2019 | Higgins | H05B 47/19 |
| 10,813,295 | B2 * | 10/2020 | Alexander | B25J 9/1679 |
| 11,580,718 | B2 * | 2/2023 | Padwick | G06T 7/11 |
| 11,647,700 | B2 * | 5/2023 | Alexander | B25J 9/1679 |
| | | | | 700/228 |

(Continued)

FOREIGN PATENT DOCUMENTS

| | | |
|---|---|---|
| JP | 6012324 B2 | 10/2016 |
| KR | 101832724 B1 | 4/2018 |
| WO | 2021005589 A1 | 1/2021 |

OTHER PUBLICATIONS

International Patent Application No. PCT/US2023/016306, International Search Report and Written Opinion mailed Jul. 12, 2023, 10 pages.

*Primary Examiner* — Gregory M Desire
(74) *Attorney, Agent, or Firm* — Conley Rose, P.C.

(57) ABSTRACT

A plant or a group of plants in a grow facility may be registered for tracking based on a corresponding unique plant identifier (UPI) feature set as extracted from one or more images captured by a plurality of image sensors monitoring the grow facility. One or more locations of the plant or the group of plants in the grow facility at one or more dates and times may be identified based on the corresponding UPI feature set as the plant or the group of plants grow in the grow facility. The plant or the group of plants may be de-registered from being tracked based on the corresponding UPI feature set when the plant or the group of plants reaches an end of a growth cycle in the grow facility. Alternatively, visual identifier devices and/or regions of interest (ROIs) may be used with or without UPI feature sets for such tracking.

21 Claims, 13 Drawing Sheets

(56) References Cited

U.S. PATENT DOCUMENTS

| | | | |
|---|---|---|---|
| 11,750,240 B2* | 9/2023 | de Koning | A01G 31/042 |
| | | | 340/8.1 |
| 11,803,959 B2* | 10/2023 | Yang | G06N 3/084 |
| 2018/0373937 A1 | 12/2018 | Shulman | |
| 2019/0323253 A1* | 10/2019 | Benvie | A01G 9/24 |
| 2020/0196535 A1* | 6/2020 | Dagondon | G06N 3/08 |
| 2021/0058603 A1 | 2/2021 | Redden | |

\* cited by examiner

AUTOMATED PLANT GROUPING AND TRACKING USING IMAGE DATA

BACKGROUND

In many industries, tracking objects through space and time, such as plants, groups of plants, and animals, has proven to be a challenge without using explicit visual identifier devices such as radio frequency identification (RFID) tags or visual tracking tags. Oftentimes, the placement and maintenance of these visual identifier devices may incur a significant human resource overhead for large operations. Such overhead may cost a grower or a producer that desires to track objects in these industries time, money, as well as make their process less efficient.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
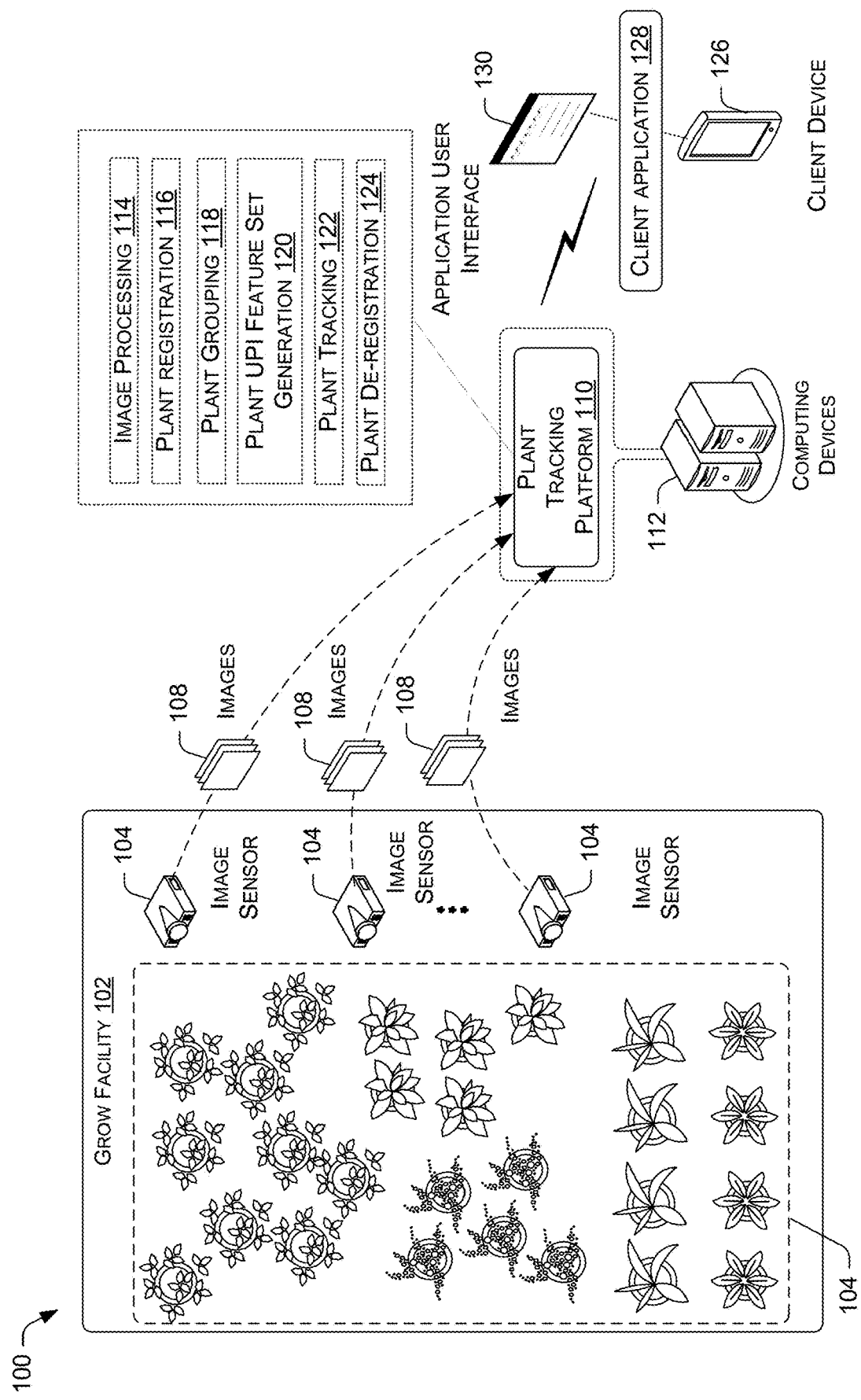
FIG. 1 illustrates an example environment that enables the use of image feature data to automatically group and track plants in a grow facility during a grow operation of the plants.

This disclosure is directed to techniques that enable the use of image feature data to automatically group and track plants in a grow area as during the grow operation of the plants. A plant, like many objects, is composed of a number of components, which as a whole define the object. For example, a particular plant or a group of plants can be characterized by its leaves, fingers, flowers, fruits, stems, stalks, and/or so forth. Similarly, a particular animal can be characterized by the unique spatial and chromatic patterns on its skin, its torso shape, body appendage characteristics, and/or so forth. Due to the somewhat random nature of the plant or animal growth process, the spatial and spatial-temporal relationships of the components of a particular plant or animal may be unique for the particular plant or animal, much like a snowflake always has a unique structural composition. Thus, the unique structural combination of components of each plant can be used to replace or augment physical visual identifier devices for the purpose of simultaneously identifying and tracking the corresponding location of the plant during a growth cycle of the plant in a grow area. For example, the physical visual identifier devices may include visual tracking tags in the form of machine-readable codes. In this way, individual plants or groups of plants may be tracked from the times of their planting to the times of their harvest.

The structure of a plant or group of plants may be learned explicitly through a component hierarchy or indirectly learned through sensory inputs obtained for the plant or the group of plants. The sensory inputs may include image data obtained through a camera or a set of cameras, e.g., image sensors. Thus, given a grow operation that may be partially or fully observed by a camera or set of cameras, a system may be implemented to track individual plants and/or groups of plants through space and time without incurring the time and resource overhead that typically comes with using physical visual identifier devices.

In some embodiments, a plant or a group of plants in a grow facility may be registered for tracking based on a corresponding unique plant identifier (UPI) feature set as extracted from one or more images captured by a plurality of image sensors monitoring the grow facility. One or more locations of the plant or the group of plants in the grow facility at one or more dates and times may be identified based on the corresponding UPI feature set as the plant or the group of plants grow in the grow facility. The plant or the group of plants may be de-registered from being tracked based on the corresponding UPI feature set when the plant or the group of plants reaches an end of a growth cycle in the grow facility.

In other embodiments, a plant or a group of plants in a grow facility may be registered for tracking based on one or more associated visual identifier devices as detected from one or more images captured by image sensors monitoring the grow facility. One or more locations of the plant or the group of plants in the grow facility at one or more dates and times may be identified based on the one or more visual identifier devices as the plant or the group of plants grow in the grow facility. The plant or the group of plants may be de-registered from being tracked based on the one or more associated visual identifier devices when the plant or the group of plants reaches an end of a growth cycle in the grow facility. The techniques described herein may be implemented in a number of ways. Example implementations are provided below with reference to the following FIGS. 1-12.

Example Environment

FIG. 1 illustrates an example environment 100 that enables the use of image feature data to automatically group and track plants in a grow facility during the grow operation of the plants. The environment 100 may include a grow facility 102 providing a grow area that supports a grow operation. For example, the grow facility 102 may be a greenhouse or another indoor or outdoor horticulture facility that is used to produce plants that are of commercial value. The grow facility 102 may be fully or partially covered by a set of image sensors 104 directed towards the grow area in which plants 106 are grown. The image sensors 104 may include any combination or amount of statically mounted and/or mobile cameras. For example, the cameras may include moving ground cameras (e.g., cameras on board unmanned ground vehicles), aerial cameras (e.g., cameras carried by a drone, plane, blimp, and/or so forth), rail-mounted cameras that move along fixed tracks on the ground, ceiling, or any other facility surface in the grow area. In other examples, the cameras may include gondola-based cameras, hand-held cameras (e.g., smartphones), or satellite-based cameras. However, the image sensors 104 are not limited to the aforementioned set of devices, and that any imaging device capable of capturing images at any wavelength of light may be used as image sensors 104.

In various embodiments, the image sensors 104 may capture images 108 of the plants 106 in the grow area at periodic intervals in a synchronized or asynchronous manner. The image sensors 104 may store the captured images 108 locally on the devices, in a database at the horticulture facility, or in the cloud. Thus, the image sensors 104 may use any form of network communication (e.g., Wi-Fi, Bluetooth, cellular, ethernet, etc.) to transmit the images 108 to other devices, receive asynchronous requests from other devices, etc., in order to capture and store the images 108.

The images 108 captured by the image sensors 104 may be used by a plant tracking platform 110 to group and track the plants 106 during their growth cycles. The plant tracking platform 110 may be a software application that is implemented on one or more computing devices 112. In order to group and track plants, the plant tracking platform 110 may perform tasks that include image processing 114, plant registration 116, plant grouping 118, plant UPI feature set generation 120, plant tracking 122, and plant de-registration 124. During image processing 114, images of plants in a grow facility as captured at various dates and times by the image sensors 104 may be received and stored by the plant tracking platform 110. In some instances, multiple images of plants that are captured at a particular date and time may be further processed by the plant tracking platform 110 to generate derivative image data. For example, the derivative image data may be in the form of a stitched image, a 3D point cloud, an orthomosaic, a 3D mesh composed of a set of source images, or a volumetric or surface neural rendering of a scene image. The plant tracking platform 110 may iteratively receive, store, and process multiple new images that are received from the image sensors 104 over time in order to track the various plants in the grow facility during their growth cycles.

The plant registration 116 may be performed for each new plant or new group of plants before the plant or the group of plants is tracked by the plant tracking platform 110. During the plant registration 116, a user may explicitly register plants, or groups of plants using a client device 126, such as a phone, tablet, or computer, that is communicatively connected to the computing devices 112. The client device 126 may execute a client application 128 that displays images of plants as captured by the image sensors 104 via an application user interface 130, so that the user may select specific plants or specific groups of plants for tracking. In alternative embodiments, the plant registration 116 may be performed in an automatic manner using software algorithms that analyze images from the image sensors 104 to perform plant detection, plant group localization, and plant metadata detection. In some instances, the automatic plant registration may be performed with the aid of visual identifier devices (e.g., QR codes) that also function as locator devices. In additional embodiments, the plant registration 116 may be performed in a semi-autonomous manner by combining automatic plant detection, plant group localization, and plant metadata detection with user-inputted plant or plant group selection for tracking.

The plant grouping 118 may be performed to group plants in a grow facility that are captured in the images produced by the image sensors 104 into groups of plants for tracking by the plant tracking platform 110. In various embodiments, algorithms for boundary detection may be used to detect boundaries between plant groupings based on visual cues, visual identifier devices, prior spatial knowledge of a grow facility layout features or a scene depicted in the images, etc.

The plant UPI feature set generation 120 may be performed to extract a corresponding unique plant identification (UPI) feature set for each group of plants or each plant in a grow facility. The UPI feature sets may be used by the plant tracking platform 110 to track the plants 106 during a grow operation. Initially, features may be generated for a scene depicted by one or more images captured by the image sensor 104 based on the plant components within the scene, regardless of whether the scene has been generated through the group localization process or from raw or aggregated images. The feature data may be generated using a machine learning model, a computer vision algorithm, and/or some other comparable algorithm. The features may include plant components and their relationships that have been encoded into hierarchical graphs or other structures. Subsequently, a UPI feature set may be generated for a corresponding group of plants or a corresponding plant as identified during the plant grouping 118 based on invariant plant features of the group of plants or the plant. The UPI feature set may serve as a "barcode" that enables the group of plants or the plant to be identified and tracked within the grow facility without the use of visual identifier devices. The UPI feature set that is generated may be updated as the group of plants or the plant matures.

During plant tracking 122, the UPI feature sets may be used to track individual plants or groups of plants within a grow facility. In various embodiments, the set of features from a scene or set of scenes may be used to query against the known UPI feature sets. Once one or more matches have been found between features within a scene and UPI feature sets, these matches may be used to obtain the subset of scene data that belongs to individual plants or groups of plants. Subsequently, the obtained subset of scene data may be used for spatial tracking, computer vision analysis, or retrieval of other information on a per-plant or per-plant-group basis. For example, a user may submit a request for information on a particular plant group via the application user interface 130 of the client application 128 on the client device 126 at a particular date and time. In turn, information such as a current location of the particular group in the grow facility may be provided for presentation by the application user interface 130. Additionally, the discovery of plant features present within a scene during the plant tracking 122 may be used to discover new groups of plants in the scene.

The plant de-registration 124 may be performed for the plant or the group of plants at the end of a growth cycle. The end of a growth cycle for a plant may be reached when the plant is removed from a growth facility for any reason, such as the plant reaching maturity, the harvesting of the plant, the death of the plant, and/or so forth. The plant de-registration 124 may include archiving of the associated UPI, the associated identifier device information, and/or any other associated data, for a set of one or more plants, a group of plants, or groups of plants. In some instances, the de-registration of a plant or a group of plants may be performed automatically by the plant tracking platform 110 when the plant or the group of plants is no longer visible in the images captured by the image sensors 104. In other instances, the de-registration of a plant or a group of plants may be performed automatically by the plant tracking platform 110 when one or more visual identifier devices associated with the plant or the group of plants are no longer visible in the images captured by the image sensors 104. Alternatively, the plant tracking platform 110 may de-register a plant or a group of plants based on information manually inputted by the user via the client application 128 on the client device 126.

Example Plant Tracking Platform Components

Figure 2:
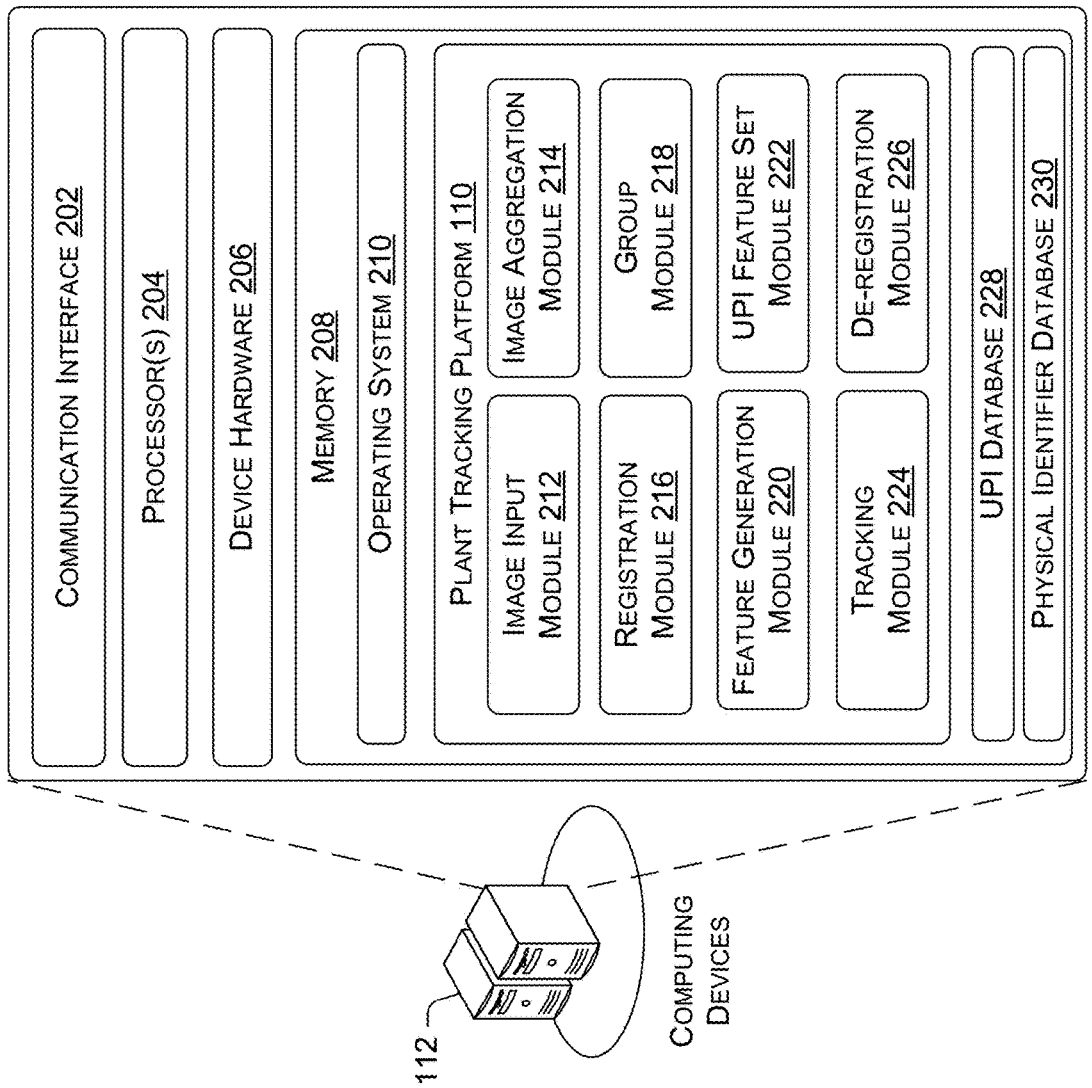
FIG. 2 is a block diagram showing various components of a plant tracking platform that supports the use of image feature data to automatically group and track plants during the grow operation of the plants.

FIG. 2 is a block diagram showing various components of a plant tracking platform that supports the use of image feature data to automatically group and track plants during the grow operation of the plants. The computing devices 200 may include a communication interface 202, one or more processors 204, memory 206, and device hardware 208. The communication interface 202 may include wireless and/or wired communication components that enable the computing devices 200 to transmit data to and receive data from other networked devices. The device hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouser devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 200 or components thereof may be virtual computing devices in the form of virtual machines or software containers that are hosted in a computing cloud.

The computing devices 200 may implement an operating system 210 and a plant tracking platform 110. The operating system 210 may include components that enable the computing devices 200 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system. The operating system 210 may support the operations of the plant tracking platform 110.

The plant tracking platform 110 may include an image input module 212, an image aggregation module 214, a registration module 216, a group module 218, a feature generation module 220, a UPI feature set module 222, a tracking module 224, and a de-registration module 226. Such modules may include routines, program instructions, objects, and/or data structures that are executed by the processors 204 to perform particular tasks or implement particular abstract data types. The memory may also store in a UPI database 228 and a physical identifier database 230.

The image input module 212 may receive images from the image sensor 104 for processing via network communication. In various embodiments, the image input module 212 may include a workflow scheduler that periodically checks for and retrieves newly available data from data sources, such as the image sensors 104. Accordingly, the image input module 212 may retrieve images from the image sensors 104 via data push or data pull techniques. The workflow scheduler may handle the extraction and the handling of the data based on configurable policies. For example, a configurable policy may specify the source data location, frequency of data retrieval, handling procedures for late arrival data, data retention period, and data disposal following an expiration of the data retention period. The handling procedures for the late arrival data may specify a predetermined cutoff period during which any data arriving late may be incorporated with data that is retrieved on time for processing.

The image aggregation module 214 may aggregate a set of images that are captured by the image sensors 104 to form derivative image data, such as a scene image. For example, the derivative image data may be in the form of a stitched image, a 3D point cloud, an orthomosaic, a 3D mesh composed of a set of source images, or a volumetric or surface neural rendering of the scene image. However, the type of data generated by the image aggregation module 214 is not limited to the aforementioned formats. In alternative embodiments, the tasks performed by the image aggregation module 214 may be performed by the software on one or more image sensors 104.

The registration module 216 may register individual plants or groups of plants so that they can be tracked throughout a grow operation. In some instances, a user may explicitly register plants, or groups of plants using a client device 126, such as a phone, tablet, or computer, that is communicatively connected to the computing devices 112. For example, a client application 128 on the client device 126 may provide an application user interface 130 that displays a scene image of the plants 106 as provided by the registration module 216. The scene image may include raw or aggregated images that show registered or unregistered plants or groups. By using the application user interface 130, a user may draw boundaries on unregistered plants to indicate a plant region of interest (ROI). The plant ROI may be enclosed by a box, a sphere, a free-hand outline, a polygon, etc. in a 2-dimensional (2D) or 3-dimensional (3D) space around each desired plant group. The user may also use the application user interface 130 to input a set of metadata associated with a plant or a group of plants, such as species, variety, planting date, etc. The drawing operation may be performed with a mouse, stylus, finger on a touch screen, etc.

Plants that are already registered may be represented by indicators in the scene image, such as a superimposed mask or box around each plant. Alternatively, the user may choose to draw boundaries around plant containers, such as pots, tables, or rafts that contain the plants themselves. For each plant ROI drawn by the user, the registration module 216 may first extract explicit plant-based scene features. The explicit plant-based scene features are then used by the registration module 216 to detect a group of plants and the feature sets that describe them. Subsequently, a single UPI feature set may be generated by the registration module 216 for all of the plants in the plant ROI, or a UPI feature set may be generated and stored for each plant within the plant ROI. The registration module 216 may create a data structure being created that maps each of the UPI feature sets in the ROI to a single group of plants. Similarly, a separate data structure may be created by the registration module 216 to map the one or more UPI feature sets to the metadata manually entered into the registration module 216 by the user.

In addition to the manual entry of metadata for a group of plants within a plant ROI, a machine learning model, a computer vision algorithm, or some other classification algorithm, may be used to automatically detect metadata attributes within the ROI, such as species, variety, start date and time information, and/or so forth. Thus, the manual entry of metadata may be eliminated. This automatic metadata detection may directly leverage any latent space, plant-component, or plant-based features from the scene feature generation phase. Similarly, a machine learning model, a computer vision algorithm, or some other classification algorithm may be used to generate plant-based scene features, allowing for the automatic detection of individual plants within the scene, which in turn alleviates the need for manually specified ROIs within the plant scenes. In this scenario, a user may select one or more already identified plants within the scene using application user interface 130 by selecting an ROI instead of specifying boundaries. In this way, plants that are part of a group of plants may be automatically detected and selected. Accordingly, the registration module 216 may leverage spatial information from the plant features to produce indicators, such as a superimposed mask or box, around each plant. Similarly, plant ROIs produced from group localizations such as tables or rafts may also be presented visually to the user, so that the user may select specific plant ROIs for registration instead of individual plants. In some embodiments, such as plant ROI generation may be combined with the automatic metadata generation to provide a time-saving assisted plant group registration experience.

In alternative embodiments, plant registration may be performed in an automatic manner by the registration module 216. The automatic plant registration leverages individual plant detections from the plant-based scene feature generation phase, group localizations, and automatic metadata detection. Instead of the user using this data to perform manual selections, groups of plants may be automatically registered by the registration module 216, completely eliminating the user from the plant registration process. In other words, a user may place one or more plants within the field of view of the image sensors 104. This enables the one or more plants to be tracked throughout space and time until the one or more plants are removed from the growing operation for harvesting processing, or for some other reason. The automatic registration may utilize user-defined heuristics, configurations, or preferences to properly register plants or groups of plants that align with the growing operations processes and practices regarding the life cycles of the plants.

In a completely unstructured approach, the automatic registration may be configured to identify any new individual plant that is encountered by the registration module 216, so that the registration module 216 may track the individual plant as the plant matures. In a more structured approach, groups of plants may alternatively be grouped together using temporal, spatial, and/or metadata information. The information may indicate a specific room, a building, a space, a scene image that each group belongs to, the date and time in which the plants were first introduced, the species and variety, and/or so forth. For example, some plants that were in the same room and detected in the same scene image may be classified as lavender trees. Accordingly, these plants may be registered together in the same plant group by the registration module 216. In some instances, by bringing non-plant information, such as group localizations within a scene image, the registration module 216 may augment the grouping process by adding another way to group plants together. For example, three plant containers (e.g., tables) may be detected by the registration module 216 at the same time, in which each plant container contains its own sets of plants. Since these sets of plants are contained in the three plant containers that are detected at the same time, the registration module 216 may register these sets of plants into a single group. Accordingly, techniques of registration in such a scenario may include but are not limited to:

1. a single UPI feature set may be created for the entirety of the scene image occupied by the three plant containers.
2. a UPI feature set may be generated for the set of plants of each plant container and then linked together with the other plant container UPI feature sets via a data structure.
3. a set of plant-specific UPI feature sets may be generated for each plant container which is grouped together on a per-plant container basis with a data structure, followed by the linking of the per-plant container data structures to other comparable data structures to link all of the plant containers together.
4. a set of plant-specific UPI feature sets across all plant containers may be linked by a single data structure.

As such, any plant-specific information, plant container-specific, and/or boundary-specific spatial or temporal information may be used to group new sets of plants together for registration into the system. In some additional instances, the registration module 216 may also use logistical knowledge about the grow operation conducted in the grow area to register groups of plants. For example, a grow facility may often move plants throughout the grow area in a first-in, first-out (FIFO) manner due to the use of an automated gutter system or a deep-water hydroponic system where plants move in one direction across the facility as they mature. Thus, heuristic information, such as the knowledge that plants always enter the grow area at one location, or that the plants only move in one direction, may be used by the registration module 216 to register groups of plants together. By leveraging these techniques, the boundaries of plant groups, the metadata of plant groups, and/or their UPI feature sets may be automatically detected for registration.

In some alternative embodiments, the registration of a plant or group of plants may be carried out through the use of explicit visual identifier devices that may also serve simultaneously as locator devices, rather than the use of UPI feature sets. Visual identifier devices may produce spatial or spatial-temporal patterns that can be interpreted through the image sensors 104, which may be used to uniquely identify a plant or group of plants. For example, a QR code may be placed with a group of plants on a rolling plant container (e.g., a table) or on a gutter system containing a single group of plants. In cases where groups are never expected to change positions or shape and or size, for example with static gutter systems or plant containers, visual identifier devices may be permanently fixed to the greenhouse or growing structures, eliminating the manual process of tag placement in the greenhouse.

In such a scenario, the user may choose to register a visual identifier device of a new plant or a new plant group in the grow facility directly using a client application 128 on a client device 126. Alternatively, the user may wait until the visual identifier device is detected by the registration module 216, such that the registration module 216 may use a manual, an assisted, or an automated plant registration process as previously described with respect to UPI feature sets to register the new plant group. In other words, a visual identifier device placed with a plant or group of plants may serve the same purpose as a UPI feature set for the purpose of registering the plant or the group of plants. Thus, the registration module 216 may store the information related to visual identifier devices and their associated registered plants or registered group of plants as data entries in the physical identifier database 230.

When used within a grow operation, the placement of the visual identifier devices may leverage certain heuristic information that complements the growing process, structure of the growing facility, and/or structures used to group or contain plants together. For example, due to the FIFO nature of a hydroponic pond or a gutter growing structure, visual identifier devices may be placed on the most human-accessible boundary of the item, such as at the bottom left or right corner of the group. Similarly, visual identifier devices may be placed on a boundary of a group of plants that is closest to the entrance of the growing room, to minimize the overhead of walking to the end of the group. In a different scenario, a growing facility using rolling plant containers (e.g., tables) that always move along a set of columns may have plants and plant containers that belong to the same column grouped together. In this scenario, a single identifier device may be placed anywhere in a column to be able to attribute the column of plants to a single set of metadata and enable tracking. Accordingly, a visual identifier device may be placed anywhere around or within a group as long as the methodology of choosing a specific placement for a group itself is known. The techniques for visual identifier device placement may include, but are not limited to, choosing a consistent location around, within, or on the perimeter of the group, or choosing a random placement on or around the group.

Thus, when visual identifier devices are used for registration without the use of UPI feature sets, boundary-based group localization may be utilized to identify ROIs belonging to plant groups within a scene image. For example, by using the spatial location information of the visual identifier devices, the registration module 216 may match a set of detected plant group ROIs to a set of visual identifier devices, resulting in both the fine-grained segmentation and identification of plant groups. Such matching may be carried out by performing a minimum bipartite matching of identifier device locations to expected locations of visual identifier devices for a plant or a group of plants, where graph edges are the Euclidean distance or some other distance metric between the expected and actual locations. Alternatively, such matching may be carried out by any machine learning model, a computer vision algorithm or heuristic-based algorithm, or other suitable algorithms. Thus, the visual identifier devices may be automatically matched to the detected ROIs. In other words, rather than automatically detecting an ROI and generating a UPI feature set for the ROI, the tracking module 224 may select a visual identifier device that is proximate to the ROI for association with the ROI based on one or more heuristic traits (e.g., a visual identifier device being always in the bottom right corner of the group of plants in the ROI). In this way, once a plant or a group of plants has been registered with one or more explicit visual identifier devices, the plant or the group of plants may be tracked throughout the grow facility over time by performing group localization and matching identifiers to each new captured scene.

The group module 218 may group plants in a grow facility that are captured in the images produced by the image sensors 104 into groups of plants. At the grow facility, a grower may or may not choose to group sets of plants with containers that typically are rooted in the physical world. In other words, sets of plants may be placed throughout a grow area in a completely unstructured way, or the plants may be grouped together through means of physical containers and or geo-spatial boundaries. For example, physical containers that are typically used by plants may include but are not limited to hydroponic rafts, groups of hydroponic rafts, static or moving gutters, static or rolling benches, or grid-based trays. A set of geospatial coordinates used by the grower may define an ROI that groups a set of plants together, or the ROI may be defined by a set of physical containers that contain sets of plants. Similar to geospatial coordinates, the delineation of plant groups may be defined by a set of one or more physical markers, e.g., visual identifier devices, explicitly placed for the purpose of plant grouping. Alternatively, plant groups may be defined by inherent structural features of the grow facility that enable grouping through identifiable visual cues, such as posts or corners of a pond, edges or corners of a table, trellis poles, a pattern or texture inherent to a plant container, etc.

Regardless of the techniques the grower chooses to group one or more plants together, it is a commonality between the majority of techniques that there exists a set of visual cues detectable by the human eye, or an imaging sensor, which may be used to consistently identify the boundaries around groups of plants. As plants mature to taller heights and/or denser canopies, these cues may become less apparent or disappear altogether, making the task of group localization much harder for a human or imaging sensor observer.

From a pure localization perspective, the visual cues that are often apparent to a visual observer may be used by a vision system to automatically detect, but not immediately identify, groups of plants within a growing area or scene. Using some set of un-aggregated images, a set of aggregated images, or a combination of the two types of images, from a set of image sensors 104, the group module 218 may localize a group or a set of groups within an image, thus allowing the plant tracking platform 110 to track plant growth at a more granular level. Accordingly, the group module 218 may be configured to use various techniques to perform plant group detecting via visual boundary cues.

In a first method, the group module 218 may use a machine learning model (e.g., a convolutional neural network, transformer, or any other model) or a computer vision algorithm to detect visual boundary cues within the set of raw source images, a set of aggregated images, or a combination of the two types of image. A boundary detection may take any form, for example, a bounding box, a point, a line, a polygon, a segmentation mask, etc. Once boundary detection has been performed on the source image sets, the group module 218 may use another machine learning model (e.g., a graph neural network, transformer, etc.) or any algorithm to take the set of boundaries and use them to directly predict a set of groups present within the set of source images. Each boundary is associated with its one or more detected groups. As such, the boundaries may be used later for more fine-grained segmentation of the groups. The group module 218 may use this method when the cost of generating aggregated images is expensive and it is easier to annotate or build analysis off of the raw image sets.

In a second method, rather than identifying individual boundaries within a source image, the group module may use a machine learning model (e.g., a convolutional neural network, transformer, or any other model), or a computer vision algorithm to directly predict the region-of-interest (ROI) of a set of groups present within the source image. The format of the ROI may include but is not limited to a bounding box, polygon, segmentation mask, set of corners, or vector of image database entries that compose the ROI itself. Once groups of ROIs have been identified, the group module 218 may use the first method described above to perform more granular boundary detection if the chosen ROI format is not conducive to find-grained boundary segmentation (e.g., a bounding box). In this case, the first stage could be considered a "coarse-grained" localization of a set of groups in a set of images, and the second stage via the second method may be used to understand the groups at "fine-grained" level. By decoupling the course group localization and fine-grained boundary segmentation, more task-specific models may be used by the group module 218. Thus, such decoupling may potentially simplify the pipeline and improve robustness.

In short, a single instance or set of machine learning models, computer vision algorithms, or other classification algorithms, can be used to identify groups of plants within a scene, which may, in turn, be used to perform course-grained attribution of images belonging to a specific plant group and additionally obtain a fine-grained understanding of the boundaries within the images belonging to the plant groups. Thus, by using these techniques, the group module 218 may automatically generate an ROI for one or more sets of plants using visual boundary cues. In various embodiments, following the generation of an ROI for the one or more sets of plants, the group module 218 may use the registration module 216 to prompt a user to manually enter metadata for the one or more sets of plants in the ROI, prompt the registration module 216 to automatically detect metadata for the one or more sets of plants, and/or prompt the registration module 216 to automatically associate existing metadata of the plants with the one or more sets of plants.

In some cases, there may not be a rich set of visual cues for a pure boundary-based group localization method to operate effectively. Cues may be abundantly available for some boundaries of the group, but non-existent for others. For example, consider a three-column set of hydroponic rafts placed in a pond with a black-colored perimeter. When growing, for example, a Thai Basil crop, the canopies may become indistinguishable when at full maturity. In this scenario, the only visible boundaries are between the two outer rafts plants and the black-colored edge of the pond. Without visual cues for the pure boundary-based methods to pick up on, the groups are no longer identifiable. In this case, visual identifier devices may optionally be placed at any location along the perimeter of a group of plants. This may be done at the beginning of the growth cycle or done later on. Typically, in deep water hydroponic systems, the rafts become inaccessible away from the ends of the ponds, which means these locators are usually placed at the beginning of a growth cycle. Visual identifier devices may include but are not limited to machine-readable codes (e.g., QR codes bar codes), a set of colored flags, a set of clean white rafts as delineation, infrared markers, or any other time of marker composed of some identifiable spatial or spatial-temporal pattern. Accordingly, the group module 218 may use a machine learning model, a computer vision algorithm, and/or some other comparable algorithm, to identify these visual identifier devices as part of the group localization process. In turn, the visual identifier devices may be used in conjunction with the boundary detection to supplement any group boundaries with a less-than-ideal amount of boundary detection. These visual identifier devices may be used during the aforementioned course-grained group localization, fine-grained group localization, or any other form of boundary-based group localization. The visual identifier devices may be used to define a boundary of one group, or the boundary of two groups if they share the same boundary and are delineated by the shared boundary. In this way, the group module 216 may use visual boundary cues to group plants whenever possible yet retain the flexibility to additionally use visual identifier devices as boundary cues to group plants in a hybrid approach when necessary.

In addition to explicitly visual identifier devices, a prior spatial knowledge of the geometry in the grow facility 102 may be used by the group module 218 to estimate boundaries within the scene image without immediate visual features. More specifically, boundaries within the scene image that are not expected to move, such as pond edges or gutter tracks, may be extrapolated to parts of the scene occluded by plants. For example, two columns of Thai Basil plants may be placed adjacent to each other in a hydroponic pond and are growing into each other to the point where there is no visible boundary. When the Thai Basil plants are young, a structure within the pond that separates the two columns may be visible. However, the structure may become obscured as the Thai Basil plants mature. In such an example, the group module 218 may extrapolate the location of this structure from the point where it is visible to the occluded regions of more mature plants, thereby providing a boundary where there is no obvious one just from observing at the scene image.

Thus, boundary-based localization of groups through means of visual cues, visual identifier devices, spatial priors, or some other method, may be performed on a set of raw images that capture a scene from different perspectives, a single image, orthomosaic, or some other image format that has been generated through the aggregation of raw images, or any other type of imaging input. While it is most intuitive to perform group localization in an aggregated imaging domain that removes overlap between images (e.g., in an image stitch or orthomosaic), there may exist cases where it is operationally easier for the group module 218 to annotate data in the raw image domain, as it does not require post-processing. Group localization performed by the group module 218 on the raw imaging domain also decouples any desired type of raw image aggregation from the localization itself, lending to a more modular technique that may enable new types of aggregation without a change in the group localization component. Accordingly, once a group has been localized in the raw image domain by the group module 218, the group module 218 may direct the image aggregation module 214 to aggregate the set of images that represent the group together to create a new scene image of the plant group in question.

In various embodiments, the group module 218 may transform the detected group boundaries within the group localization domain to the aggregated domain by applying the computed transformations at the locations of these detected group boundaries within the raw images. For example, the location of a QR code in a 2D image may be transformed by the computed homography matrix of its parent image from an image stitching process. Once the set of group boundaries has been obtained in the final scene domain of a group, they may then be used to further refine the scene along the edges of the boundaries to provide a more precise segmentation of the group. Detected boundaries may be fit by the group module 218 to a polygon of any number of sides and vertex configuration, a cube, sphere, any other N-dimensional shape or polygon mesh depending on the prior knowledge of the composition of groups in the scene.

In some instances, the fine-grained segmentation of a group scene through fitting to a geometric model or other models as described above may ignore plants that reach over the boundaries of the group but still belong to the group. Thus, the group module 218 may be alternatively configured to instead choose to define a bounding volume around plants that have been classified as belonging to the group itself. In this case, the group localization provides enough context to understand which plants in the global scene are within and outside of the group in question. With this information, much like with boundary detections, the group module 218 may fit a geometric model or other models to the extremities of the plants in the scene to arrive at an alternative form of segmentation of the group from the global scene. In these instances, a computer vision and or heuristic-based algorithm, machine learning algorithm, or other algorithms may be used by the group module 218 to determine which plants belong to a localized group.

The feature generation module 220 may generate a set of features directly or indirectly from an understanding of the plant components within the scene, regardless of whether the scene has been generated through the group localization process or from raw or aggregated one or more images. These components include, but are not limited to leaves, blades, petioles, stems, nodes, apical buds, stamens, carpels, flowers, apical buds, fingers, tap-roots, lateral roots, pistols, stigma, fruits, vines, and/or peduncles.

Given a set of components that a plant may be deconstructed into, the feature generation module 220 may use a computer vision and or heuristic-based algorithm, machine learning algorithm, or other algorithms to classify a set of input data from a scene in an arbitrary imaging domain into the respective components. A component within a scene may be composed of any subset of the following data, but is not limited to this set:
1. position;
2. orientation;
3. a shape descriptor (e.g., a radius, major and minor axis characteristics, etc.)
4. a classification (e.g., root, leaf, stem, blade, etc.);
5. an instance identifier (e.g., a number or some other attribute given to a component that enables one to differentiate between components of the same classification);
6. a bounding volume (e.g., a bounding box, bounding sphere, a mesh describing the exact boundaries of the component);
7. a feature vector of any dimension (e.g., an embedding from a convolutional neural network, a set of human-crafted features, a set of outputs from conventional and/or heuristic-based computer vision algorithms).

Subsequent to the identification of plant components within a scene, the set of generated components and their associated attributes may be transformed by the group module 218 into a target feature domain that is better suited for use in operations that utilize plant component information. The transformation may include but is not limited to a concatenation of flattened attributes into a single vector, a machine learning model such as an embedding or projection network on the former, or the result of a linear and or non-linear combination of all the elements. Using the set of plant components represented in the feature domain, a set of refined or more rich features can be obtained by exploiting the hierarchical and fractal nature of plants. For example, a machine learning model (e.g., a graph neural network), a computer vision algorithm, and/or some other comparable algorithm may be used by the feature generation module 220 to group sets of plant components into hierarchical graphs or other structures, such as connecting five-leaf components to a parent stem component. The feature generation module 220 may use these graphs or other structure encoding component relationships to augment the existing feature space.

In other embodiments, plants within a scene may be completely identifiable, meaning that the levels of occlusion between neighboring plants is low enough to tell neighboring plants apart with a high degree of confidence. As plants tend to mature, however, this assumption usually breaks as canopies grow into and over each other. Nonetheless, in the cases where plants are clearly separable, the feature generation module 220 may use a machine learning model (e.g., an instance segmentation model), a computer vision algorithm, and/or some other comparable algorithm to perform a per-pixel or per point classification of the entire scene, where the classification of each element indicates the unique plant to which the element belongs. This panotopic instance segmentation of the entire scene into unique plants sets the stage for feature vector generation on a per-plant basis, rather than a per-component basis, by the feature generation module 220. For example, a machine learning model (e.g., a 2D or 3D convolutional neural network), a computer vision algorithm, or some other algorithm may be used by the feature generation module 220 to generate a feature vector for the region of the scene that contains an identified plant. The region may be a bounding volume of any format, which includes but is not limited to, a bounding box, bounding cube, bounding sphere, bounding polygon. Alternatively, the same or a new machine learning model, a computer vision algorithm, or some other algorithm, may be used by the feature generation module 220 to directly output a feature vector representing each uniquely identified plant in the scene. In this way, rather than detecting boundaries, plants may be individually detected and subsequently processed to extract features that can be transformed into UPI feature sets.

In additional embodiments, in a more direct approach, the feature generation module 220 may use a machine learning model (e.g., a 2D or 3D convolutional neural network), a computer vision algorithm, and/or some other comparable algorithm to directly encode a scene into a latent feature space that encodes both semantic and localization information. For example, a 2D scene may be transformed into latent space with reduced spatial dimensions but with a larger number of channel dimensions, as exemplified by the final layers in a traditional convolutional neural network. Each spatial position in the latent space in this example provides a rich feature descriptor of a larger receptive field in the scene. In some cases, when the scene is known to only contain one group of plants (e.g., a scene that has been generated through boundary-based group localization), this latent vector may contain a significantly reduced spatial dimension solely with a large feature channel dimension, essentially providing a single feature vector for the entire scene.

The UPI feature set module 222 may generate a UPI feature set for a corresponding group of plants or a corresponding plant. While group localization through visual boundary cues may provide the location of a plant or a group of plants within a scene, explicit identification information attributed to the plant or groups of plants within a scene is still missing. Solutions like machine-readable codes physically placed with a group close the identification gap. However, the use of such codes may add operational overhead for the user and may be prone to error from humans and a chaotic grow facility environment. Thus, a unique plant identifier (UPI) feature set may be generated for a plant or a group of plants within the scene using a subset of features describing the scene.

Due to the structured, but somewhat random growth process of plants, a part-whole composition, along with any observable traits of each of the parts or the whole in a plant or a group of plants, is generally unique to each plant or group of plants. Further, since the part-whole compositions and observable traits of the plant are primarily a function of plant maturity, human intervention, environmental factors, or pests, they may largely be considered spatially invariant. This means that if a plant is simply moved around a grow area, tilted at an angle, viewed under different light conditions, etc., the traits and composition of the plant may remain the same. Thus, by identifying and using a spatially, temporally, and environment invariant representation of a plant or a group of plants, the plant or the group of plants may be tracked anywhere in a grow facility, regardless of the scene in which the plant or the group of plants appear.

The features of a UPI feature set for a corresponding plant or a corresponding group of plants or a corresponding plant may be generated from explicit plant components, whole plants, or direct latent vectors, and/or other invariant plant traits in the scene. In various embodiments, the UPI feature set for the corresponding group of plants or the corresponding plant may include a direct subset of features from the scene, or some transformed set of features from the scene that has been transformed using a machine learning model (e.g., a graph neural network), a computer vision algorithm, and/or some other comparable algorithm. For example, features from the scene may be trained or engineered by the UPI feature set module 222 to be directly spatially, temporally, or environmentally invariant, or may gain invariance properties once the transformation has been applied to the set of features from the scene to produce the UPI feature set. In addition to the invariance to spatial, temporally, and environmental characteristics of the scene, the direct or transformed set of features that are included in the UPI feature set may exhibit sufficient margins in a feature space between plants of different structural and visual compositions to be able to uniquely identify a plant or a group of plants in the scene.

Due to the chaotic and unpredictable nature of the grow facility or outdoor growing operation, predicting the environmental conditions that influence plant phenotyping in the future may become increasingly difficult with time. Further, given sufficient time, some morphological plant traits that are considered invariant may nevertheless change due to plant maturity. Thus, while invariance to plant maturity may be trained or engineered into the machine learning model, a computer vision algorithm, and/or some other comparable algorithm used to generate UPI feature sets, such algorithms may be configured to balance a tradeoff between the timeline of maturity invariance and the robustness of the UPI feature set.

Thus, a UPI feature set as generated by the UPI feature set module 222 may be a scene-invariant representation of a plant or group of plants. The UPI feature set provides a set of features unique to the composition of any type of attribute to the plant or group of plants. In this way, the UPI feature set may be used to differentiate the plant or the group of plants from other plants or groups of plants in the grow facility. In other words, the UPI feature set of a plant or a group of plants may act as a "barcode" for the plant or the group of plants. The UPI feature set module 222 may store the UPI feature sets of the plants for the groups of plants as UPI database entries in the UPI database 228.

In addition to the instantaneous features present within an image used to generate a UPI feature set, the UPI feature set may be updated with data that integrate information about how the UPI feature set changes over time. This may help to foster a larger separation between plant representations that have similar instantaneous UPI feature sets but may grow in different ways over time. Further, as a plant matures and grows over time, the morphological traits of the plant may change. This means that a set of scene features generated for an early-stage plant may be difficult to correlate with the set of features generated for the same plant as viewed in a more mature phase. Nevertheless, plants mature slowly over time, meaning that the image capture frequency of the image sensor 104 may be configured by the UPI feature set module 222 to manage the change magnitude of morphological traits. For example, a scene captured every seven days may typically have large morphological variations, while a scene captured every three hours may have marginal changes. Thus, a detected UPI feature set for a plant or a group of plants may still be matched to its prior UPI feature set from a last captured scene when the morphological distance is smaller than a predetermined distance threshold. Once matched, the UPI feature set module 222 may replace a previous UPI database entry for the plant or the group of plants with a new UPI database entry. Alternatively, the UPI feature set module 222 may combine the previous UPI database entry with the new UPI database entry. In some cases, the UPI feature sets may have been trained or engineered to be somewhat invariant to plant maturity, in which case the UPI feature set matching may be more tolerable of morphological changes and or longer times in between scene captures. In some embodiments, the UPI feature set module 222 may use a machine learning model (e.g., a multi-layer perceptron), a computer vision algorithm, and/or some other comparable algorithm to combine the current and previous UPI feature sets together. This combination may be implemented using a most recent previous UPI feature set and the new UPI feature sets, or multiple previous UPI feature sets and the new UPI feature sets.

In other instances, invariance to maturity may not be possible across the full growth cycle of a plant or group of plants. Instead, hand-engineered features or machine learning models that are invariant to maturity within time frames that span shorter subsets of a growth cycle (e.g., a three-day or one week period) may be used by the UPI feature set module 222 for UPI feature set matching. Accordingly, the longer the time window a UPI feature set may be invariant to a plant as it grows, the stronger the correlation between sequential tracking iterations of the UPI feature sets of a plant or group of plants.

The tracking module 224 may use the UPI feature sets to track individual plants or groups of plants within a grow facility. In various embodiments, the set of features from a scene or set of scenes may be used to query against the UPI database 228 of known UPI feature sets. Once one or more matches have been found between features within a scene and UPI feature sets present in the UPI database 228, these matches may be used by the tracking module 224 to obtain the subset of scene data that belongs to individual plants or groups of plants. Subsequently, the obtained subset of scene data may be used by the tracking module 224 for spatial tracking, computer vision analysis, or retrieval of other information on a per-plant or per-plant-group basis. For example, the user may submit a request for information on a particular plant or group of plants via the application user interface 130 of the client application 128 on the client device 126 at a particular date and time. In turn, the tracking module 224 may provide temporal, spatial, and/or metadata information such as species and/or variety of the particular plant or group, a current location of the particular plant or group in the grow facility, growth time of the particular plant or group, remaining time in the growth cycle of the particular plant or group, growth start date and time of the particular plant or group, expected growth cycle end date and time for the particular plant or group, the progress of morphological change for the particular plant or group, and/or so forth for presentation by the application user interface 130. Further, the discovery of plant features present within a scene that are not tracked in the UPI database 228 by the tracking module 224 may be used to discover new groups of plants. When searching through a scene feature space for a UPI feature set or UPI feature sets present within the UPI database 228, the tracking module 224 may take into account the domain of both the UPI database entries and the scene features themselves.

The search performed by the tracking module 224 may be classified into two distinct categories: (1) searching when the domain of UPI database entries and scene features are the same; and (2) searching when the domain of UPI database entries differ from the domain of the features in the scene. The latter case may occur if any transformation was applied to the scene feature space by the feature generation module 220 to arrive at a UPI feature set, for example, to reduce the dimensionality of UPI feature sets or introduce invariance to characteristics of one or more plants and/or one or more scenes.

In the former case of UPI database and scene features being in the same domain, a multitude of techniques may be used by the tracking module 224 to perform direct searches in plant-component, plant, latent, and/or other feature domains. In the case of a plant-component feature domain, a subset of feature vectors representing plant components in the scene may be matched to a set of feature vectors within a UPI feature set by performing a nearest neighbors vector matching of the two sets, and then averaging the $L_1$, $L_2$ or some other distance metric between the nearest neighbor feature vectors. In other instances, a minimum bipartite graph matching may be used by the tracking module 224 to obtain the lowest cost matching between feature sets if each feature vector is treated as a graph node, where the cost may be defined as the $L_1$, $L_2$, or some other distance metric between nodes. In instances in which a hierarchical graph structure is available between some or all of the feature vectors of plant components in a scene, the tracking module 224 may use a sub-graph searching algorithm implemented by a machine learning model (e.g., a graph neural network), a computer vision algorithm, or some other algorithm, to exclusively match or provide more context to other matching methods in a hybridized approach. While these are some of the algorithms that may be used by the tracking module 224 to perform matching in plant component space, any machine learning model, a computer vision algorithm, and/ or some other comparable algorithm may be used by the tracking module 224 to perform the matching.

For any subset of the plant-component feature domain queried against a specific UPI feature set, a set of scores or costs can be generated to rank potential matches. This set of ranked matches, in addition to the sets of ranked matches belonging to other UPI feature sets in the UPI database 228, may then be used by the tracking module 224 to generate a set of most-likely matches for each UPI feature or a subset of UPI feature sets in the UPI database 228.

In a plant-based feature or latent scene feature space, similar searching techniques to plant-component feature space may be used to generate ranked matches between scene features and UPI feature sets present within the UPI database 228. In other words, a plant-specific feature vector or subset of feature vectors in latent space from the scene may be directly compared using a distance-based metric such as $L_1$, $L_2$, or other types of distance metric. A distance metric or some other comparison metric may also be generated by the tracking module 224 through a machine learning model, a computer vision algorithm, and/or some other comparable algorithm that is used to compare direct sets of feature vectors. The comparison metric may take on any dimension, but typically take the form of a single cost, distance, or score.

In the latter case of different domains between the UPI database 228 and scene features, a transformation layer may be used by the tracking module 224 to transform features in the scene to that of the UPI feature set domain, to transform a UPI feature set to become set of features in the scene features domain or transform both the features from the scene domain and the UPI domain to a mutual intermediary domain that does not take the form of the original domains. Once the feature sets in their respective domains have been translated to a common domain, the tracking module 224 may directly compare the feature sets using any other direct comparison methods described above with respect to the former case of UPI database and scene features having the same domain. The use of the transformation layer by the tracking module 224 may result in the module being configured to perform additional data processing for some domains based on the relationships between the domains. For example, a large set of scene features that were not trained or engineered to have spatial, temporal, and or environmental invariance may be described by the same UPI feature set, meaning the transformation layer may produce a set or distribution of possible feature sets in the scene feature domain that is to be individually searched in the scene. In alternative instances, the tracking module 224 may use a machine learning model, a computer vision algorithm, and/or some other comparable algorithm to perform a direct comparison between different feature domains without the use of the transformation layer.

When a UPI feature set in the UPI database 228 has been created to represent a group of plants, for example, a group of chrysanthemum plants on a table, a search against the UPI database 228 may be simplified by leveraging the bounding volume from boundary-based group localization of the plant container. In other words, the search space of the scene may be greatly reduced by understanding the bounding volume of plants within the scene and only searching for UPI feature sets within this volume. In the simplest case, a latent feature vector may be generated directly from the bounding volume during the scene feature generation process, resulting in a single feature for the entire scene, cutting out the spatial component of the search and thus reducing the scope of the search. In other words, the UPI feature sets may be used collectively with the use of boundaries to speed up the search for one or more plants.

In all cases of searching, a true match may be decided by some simple threshold on the cost or score of the operation. This threshold may be computed dynamically using context from historical searches metadata, the scene features themselves, or any other relevant source of available information in the system. In the case of a non-static threshold, such a threshold may be computed through a machine learning model, a computer vision algorithm, and/or some other comparable algorithm. In alternate embodiments, a machine learning model, a computer vision algorithm, or some other algorithm, may be trained or engineered to perform classification based on whether a true match has been found through the search process. Once a match has been found, the tracking module 224 may use the found UPI feature set to update the existing representation of the plant or group of plants, localize the data elements in the input scene domain that can be attributed to the UPI feature set, trigger some form of analysis or post-processing on the plant or the plant group, and/or so forth.

The de-registration module 226 may de-registered a plant or a group of plants from the UPI database 228 when the plant or the group of plants has been harvested or moved out of the grow area for shipment or processing. In various embodiments, the de-registration performed by the de-registration module 226 may include archiving of the associated UPI, the associated identifier device information, and/or any other associated data, for a set of one or more plants, a group of plants, or groups of plants. In a naive approach, the de-registration module 226 may choose to de-register a plant or a group of plants from the platform once the plant or the group of plants, i.e., one or more UPI features sets or visual identifier devices associated with the plant or the group of plants, has not been observed in any new images or new scene images in a predetermined time period, e.g., a predetermined number of days.

In a more nuanced approach, the lag of waiting for a threshold amount of time for de-registration may be eliminated by understanding the location of the plant or group of plants in a grow facility. More specifically, there may exist specific locations in the grow facility in which plants are expected to be in the final part of their growth cycle, and inversely designated regions of the grow facility where plants are not expected to disappear from the facility. In such an approach, when plants or groups of plants are observed as being in these designated regions, a smaller amount of threshold time absent from these designated regions may be used by the de-registration module 226 to de-register the plants or groups of plants. In other embodiments, a threshold amount of time may also be determined as a function of location within the growing operation at a granular level through a machine learning model, a computer vision algorithm, and/or some other comparable algorithm.

In additional embodiments, the de-registration of plants or groups of plants may be performed manually by the user via the client application 128 on the client device 126. For example, information about the length of the growth cycle for one or more plants or a group of plants may be inputted to the de-registration module 226 during the plant registration 116, providing a date and time in which the one or more plants or the group of plants is to be de-registered. Such date and time information may be manually entered by the user into the de-registration module 226. Alternatively, such date and time may be downloaded by the de-registration module 226 from a database that maps species, variety, or other plant metadata to growth cycle lengths.

While the functionalities of the various modules of the plant tracking platform 110 are described above, it will be appreciated that the components of plant registration, such as localization, identification, and metadata attribution, may be implemented using the plant tracking platform 110 in different combinations. For example, as shown in Table I below, any technique in one column may be implemented with any other technique from different columns. For example, a user may choose to configure the plant tracking platform to perform individual plant detection, identify each plant based on a UPI feature set, and automatically detect all metadata. In another example, the user may choose to configure the plant tracking platform to perform individual plant detection, use a visual identifier device placed with each plant to act as the identifier, and manually enter all metadata at the time of visual identifier device association.

TABLE I

Registration Technique Taxonomy

| Localization technique | Identifier technique | Metadata technique |
|---|---|---|
| Visual identifier device placed along one or more boundaries | Visual identifier device | Manual entry |
| Individual plant detection | UPI feature set | Automatic detection |
| Group boundary detection (i.e., table or raft) | Location of static ROI | Hybrid (some manual metadata, some automatic) |
| Predefined ROIs with geo-spatial coordinates | | |
| Virtual (i.e., in application) plant selections, ROI definitions, etc. | | |

Furthermore, the components of plant group tracking, such as localization and identification, may be implemented using the plant tracking platform 110 in different combinations. For example, as shown in Table II below, any technique in one column may be implemented with any other technique from another column. For example, a user may choose to configure the plant tracking platform to detect plant groups through boundary detections from a scene, and then identify the plant groups using a UPI feature set generated from the extracted features of the plant groups. In another case, a user may choose to configure the plant tracking platform to detect plant groups through boundary detections from a scene, and then identify the plant groups using a visual identifier device placed within the group. The localization and identification techniques are a subset of the localization and identification techniques present within the registration taxonomy.

TABLE II

Localization Technique Taxonomy

| Localization method | Identifier method |
| --- | --- |
| Visual identifier device placed along one or more boundaries | Visual identifier device |
| Individual plant detection | UPI feature set |
| Group boundary detection (i.e., table or raft) | Location of static ROI |
| Pre-defined ROIs with geo-spatial coordinates | |

Example Processes

FIGS. 3-12 present illustrative processes 300-1200 for using image data to automatically group and track plants in a grow area during a grow operation of the plants. Each of the processes 300-1200 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-1200 are described with reference to the environment 100 of FIG. 1.

Figure 3:
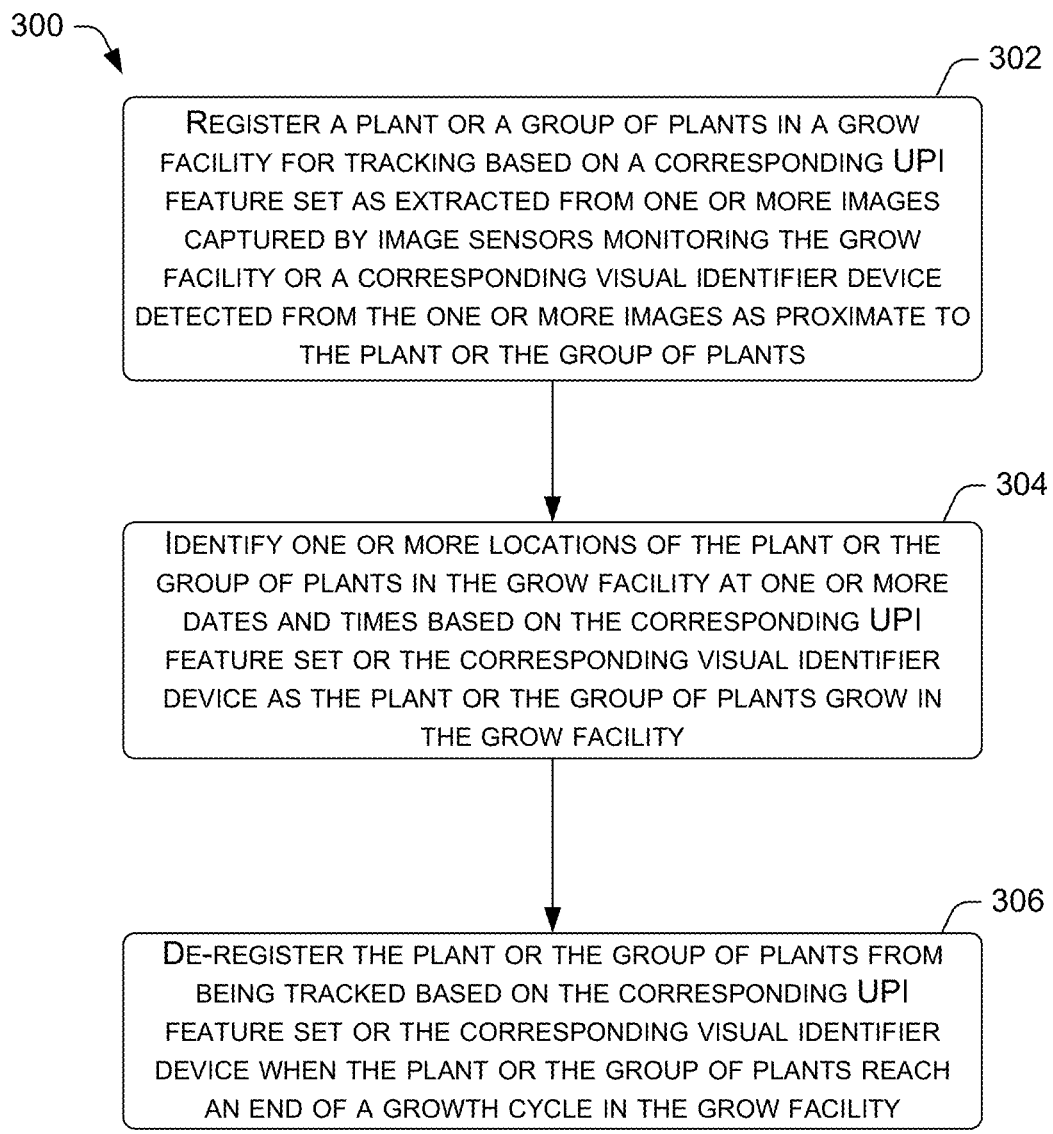
FIG. 3 is a flow diagram of an example process for using unique feature identifier (UPI) feature sets of plants to track the plants during the grow operation of the plants.

FIG. 3 is a flow diagram of an example process 300 for using unique feature identifier (UPI) feature sets of plants to track the plants during the grow operation of the plants. At block 302, the plant tracking platform 110 may register a plant or a group of plants in a grow facility for tracking based on a corresponding UPI feature set of the plant or the group of plants or a corresponding visual identifier device detected from the one or more images as proximate to the plant or the group of plants. The UPI feature set may be extracted from one or more images captured by image sensors monitoring the grow facility. In some embodiments, a user may explicitly register plants, or groups of plants using a client device 126, such as a phone, tablet, or computer, that is communicatively connected to the computing devices 112. In other embodiments, automatic registration may be performed with the use of software algorithms. In additional embodiments, the registration may be performed in a semi-autonomous manner by combining automatic plant detection, plant group localization, and plant metadata detection with user-inputted plant or plant group selection.

At block 304, the plant tracking platform 110 may identify one or more locations of the plant or the group of plants in the grow facility at one or more dates and times based on the corresponding UPI feature set or the corresponding visual identifier device as the plant or the group of plants grow in the facility. For example, a user may submit a request for information on a particular plant or group of plants via an application user interface of a client application on a client device at a particular date and time. In turn, information such as a current location of the particular plant or group in the grow facility may be provided for presentation by the application user interface. Other information provided may include species and/or variety of the particular plant or group, a current location of the particular plant or group in the grow facility, growth time of the particular plant or group, remaining time in the growth cycle of the particular plant or group, growth start date and time of the particular plant or group, expected growth cycle end date and time for the particular plant or group, the progress of morphological change for the particular plant or group, and/or so forth. The corresponding UPI feature set may be further extracted from one or more additional images captured by the image sensors at various dates and times as the growth cycle continues.

At block 306, the plant tracking platform 110 may de-register the plant or the group of plants from being tracked based on the corresponding UP feature set or the corresponding visual identifier device when the plant or the group of plants reaches an end of a growth cycle in the grow facility. In some embodiments, the de-registration of a plant or a group of plants may be performed automatically by the plant tracking platform 110 when the plant for the group of plants is no longer visible or no longer visible for a predetermined period of time in the images captured by the image sensors 104. In other embodiments, the de-registration of a plant or a group of plants may be performed automatically by the plant tracking platform 110 when the corresponding visual identifier device is no longer visible or no longer visible for a predetermined period of time in the mages captured by the image sensors 104. Alternatively, the plant tracking platform 110 may de-register a plant or a group of plants based on information manually inputted by the user via the client application 128 on the client device 126. In alternative embodiments, the registering of the plant or the group of the plants for tracking, the tracking of the plant or the group of plants, as well as the de-registering the plant or the group of plants for tracking may be performed using an ROI as captured in the one or more images. In such embodiments, the ROI may be used as an identifier for the plant for the group of plants. For example, there may be an ROI that has the vertices (0,0),(1,0),(0,1),(1,1) meters in a grow facility with a 2D cartesian configuration, or an ROI with the vertices (0,0,0),(1,0,0),(0,1,0),(1,1,0),(0,0,1),(1,0,1),(0,1,1),(1,1,1) in a grow facility with a 3D cartesian configuration.

Figure 4:
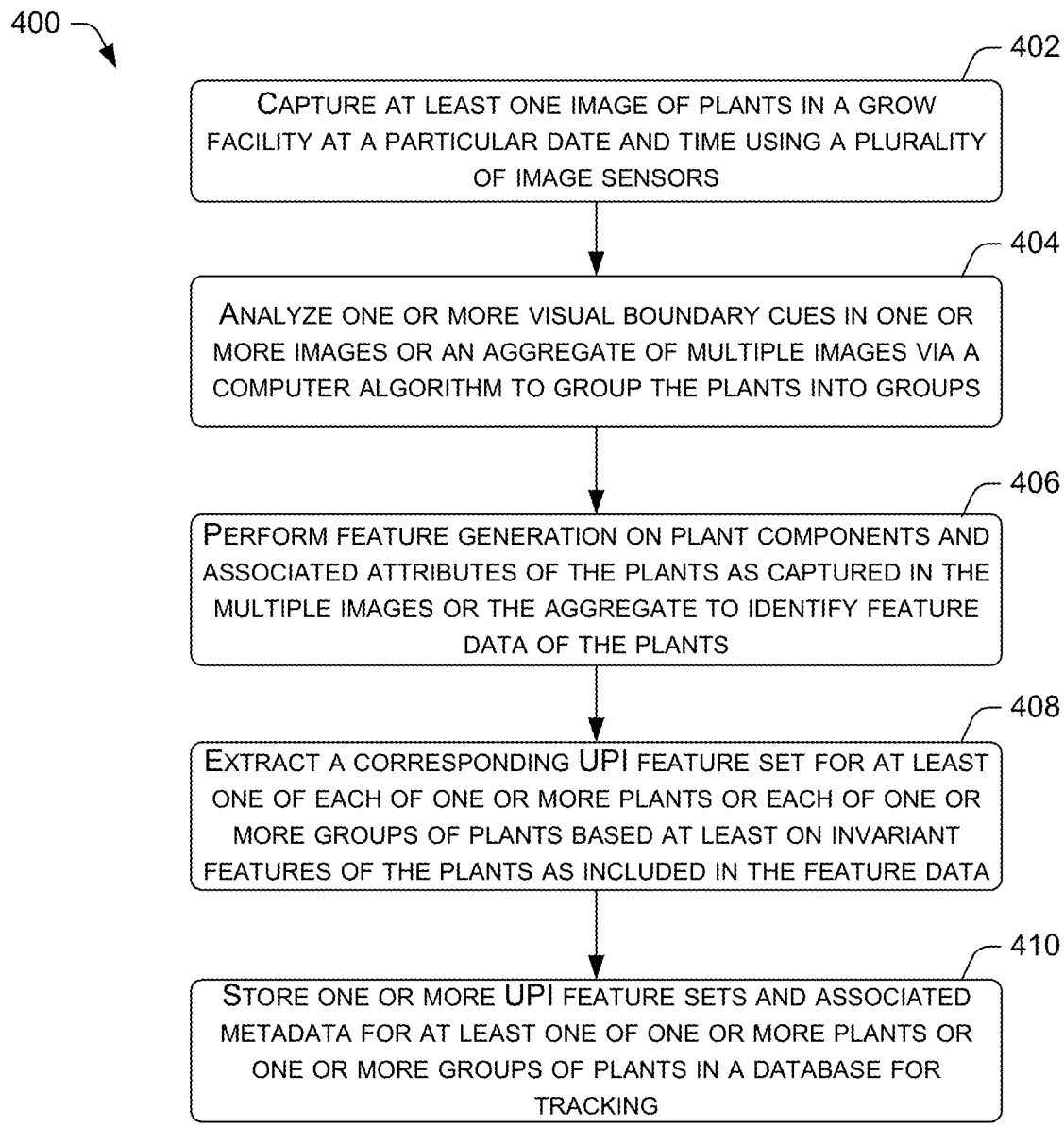
FIG. 4 is a flow diagram of an example process for obtaining and updating image feature data that enable the automatic grouping and tracking of plants during the grow operation of the plants.

FIG. 4 is a flow diagram of an example process 400 for obtaining and updating image feature data that enable the automatic grouping and tracking of plants during the grow operation of the plants. The example process 400 may provide further details regarding the registration described in block 302 of the process 300. At block 402, the plant tracking platform 110 may capture at least one image of plants in a grow facility at a particular date and time using a plurality of image sensors. The image sensors may include any combination or amount of statically mounted and/or mobile cameras. In various embodiments, the image sensors may capture images of the plants in the grow facility at periodic intervals in a synchronized or asynchronous manner.

At block 404, the plant tracking platform 110 may analyze one or more visual boundary cues in one or more images or an aggregate of multiple images via a computer algorithm (e.g., a machine-learning algorithm) to group the plants into groups. The aggregate of the multiple images may include a set of aggregated images, derivative image data, and/or so forth. In various embodiments, a machine learning model (e.g., a convolutional neural network, transformer, or any other model) or a computer vision algorithm, visual identifier devices, and/or a prior spatial knowledge of the geometry in a grow facility may be used to detect visual boundary cues within the set of raw source images, a set of aggregated images, or a combination of the two types of image.

At block 406, the plant tracking platform 110 may perform feature generation on plant components and associated attributes of the plants as captured in the multiple images or the aggregate to identify feature data of the plants. In various embodiments, the plant tracking platform 110 may use a computer vision and or heuristic-based algorithm, machine learning algorithm, or other algorithms to identify feature data directly or indirectly from an understanding of the plant components as visually captured. These components include, but are not limited to leaves, blades, petioles, stems, nodes, apical buds, stamens, carpels, flowers, apical buds, fingers, tap-roots, lateral roots, pistols, stigma, fruits, vines, and/or peduncles.

At block 408, the plant tracking platform 110 may extract a corresponding UPI feature set for at least one of each of one or more plants or each of one or more groups of plants based at least on invariant features of the plants as included in the feature data. The features of a UPI feature set for a corresponding plant or a corresponding group of plants may be generated from explicit plant components, whole plants, or direct latent vectors, and/or other invariant plant traits. In various embodiments, such a UPI feature set may include a direct subset of features, or some transformed set of features that has been transformed using a machine learning model, a computer vision algorithm, and/or some other comparable algorithm.

At block 410, the plant tracking platform 110 may store UPI feature sets and associated metadata for at least one of one or more plants or one or more groups of plants in a database. The stored UPI feature sets and the associated metadata may be used to track the at least one of the one or more plants or the one or more groups of plants over time by the plant tracking platform 110. In various embodiments, individual UPI feature sets stored in the database may be updated with data that integrate information about how the individual UPI feature sets change over time. Thus, the plant tracking platform 110 may iterate the blocks 402-408 to repeat the detection of UPI feature sets for a plant or a group of plants. As a result, a newly detected UPI feature set for the plant or the group of plants may be matched to its prior UPI feature set stored in the database. For example, the plant tracking platform 110 may replace a previous UPI database entry for the plant or the group of plants with a new UPI database entry. Alternatively, the plant tracking platform 110 may combine the previous UPI database entry with the new UPI database entry.

Figure 5:
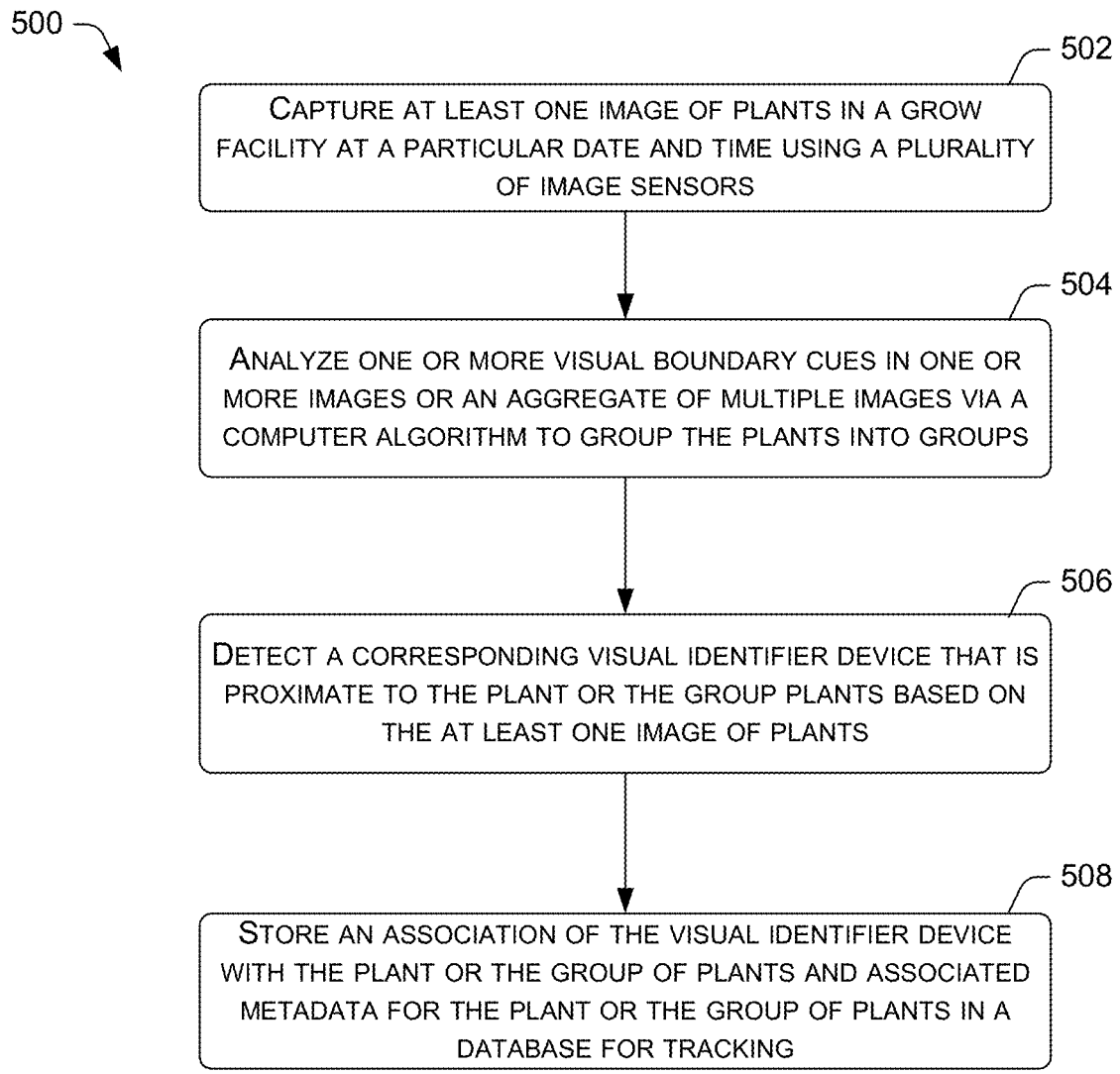
FIG. 5 is a flow diagram of an example process for using a visual identifier device to identify new groups of plants for tracking during the grow operation of the plants.

FIG. 5 is a flow diagram of an example process 500 for using a visual identifier device to identify new groups of plants for tracking during the grow operation of the plants. The example process 500 may provide further details regarding the registration described in block 302 of the process 300. At block 502, the plant tracking platform 110 may capture at least one image of plants in a grow facility at a particular date and time using a plurality of image sensors. The image sensors may include any combination or amount of statically mounted and/or mobile cameras. In various embodiments, the image sensors may capture images of the plants in the grow facility at periodic intervals in a synchronized or asynchronous manner.

At block 504, the plant tracking platform 110 may analyze one or more visual boundary cues in one or more images or an aggregate of multiple images via a computer algorithm (e.g., machine-learning) to group the plants into groups. The aggregate of the multiple images may include a set of aggregated images, derivative image data, and/or so forth. In various embodiments, a machine learning model (e.g., a convolutional neural network, transformer, or any other model) or a computer vision algorithm, visual identifier devices, and/or a prior spatial knowledge of the geometry in a grow facility may be used to detect visual boundary cues within the set of raw source images, a set of aggregated images, or a combination of the two types of image.

At block 506, the plant tracking platform 110 may detect a visual identifier device that is proximate to the plant or the group of plants based on the at least one image of plants. In various embodiments, a visual identifier device may produce spatial or spatial-temporal patterns that can be interpreted through image sensors, which may be used to uniquely identify a plant or group of plants. For example, a QR code may be placed with a group of plants on a rolling plant container (e.g., a table) or on a gutter system containing a single group of plants. At block 508, the plant tracking platform 110 may store an association of the visual identifier device with the plant or the group of plants and associated metadata for at least one of one or more plants or one or more groups of plants in a database.

Figure 6:
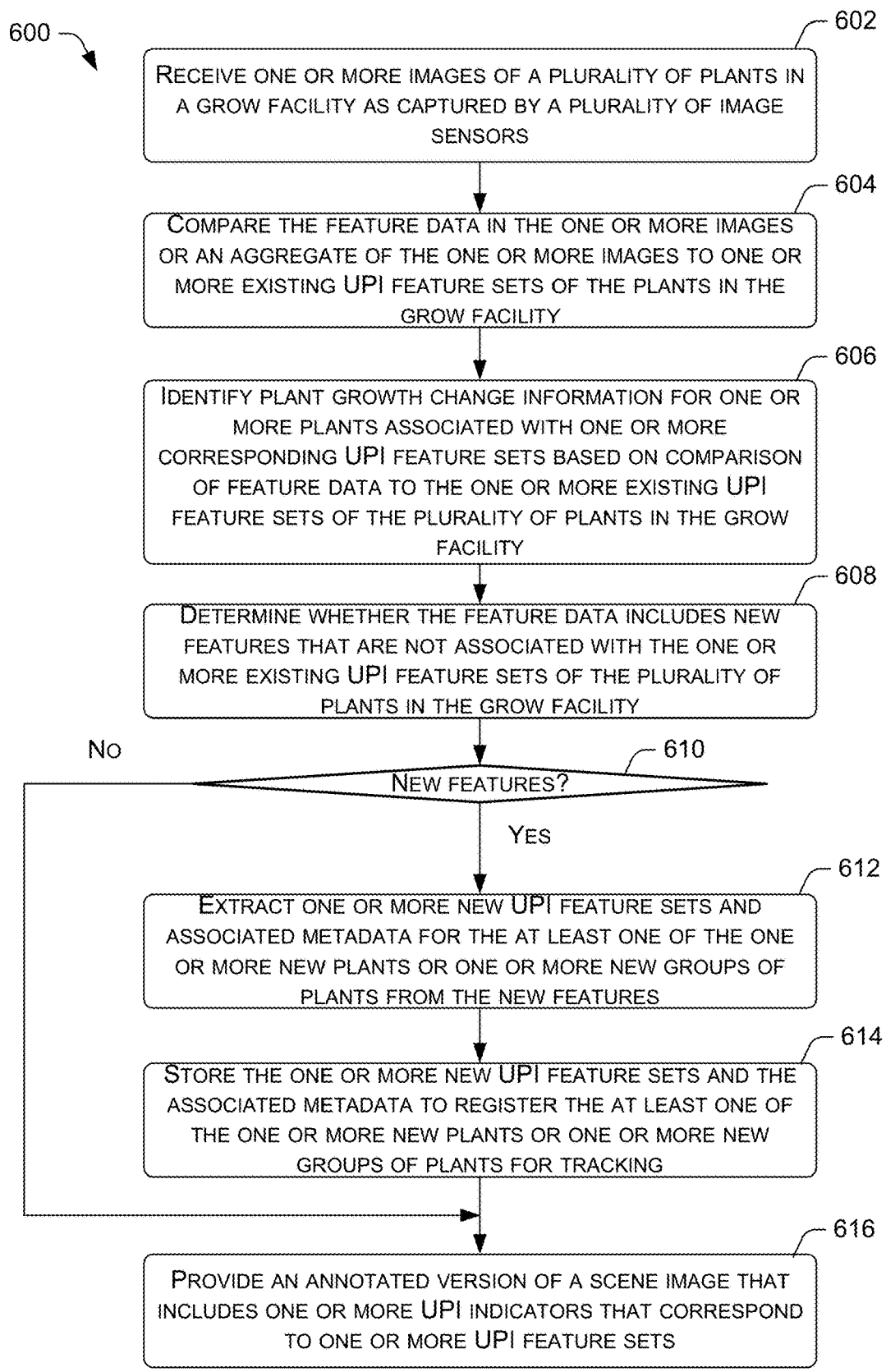
FIG. 6 is a flow diagram of an example process for using image feature data to identify new groups of plants for tracking during the grow operation of the plants.

FIG. 6 is a flow diagram of an example process 600 for using image feature data to identify new groups of plants for tracking during the grow operation of the plants. The example process 600 may provide further details regarding the registration described in block 302 of the process 300. At block 602, the plant tracking platform 110 may receive one or more images of a plurality of plants in a grow facility as captured by a plurality of image sensors. The image sensors may include any combination or amount of statically mounted and/or mobile cameras. In various embodiments, the image sensors may capture images of the plants in the grow facility at periodic intervals in a synchronized or asynchronous manner.

At block 604, the plant tracking platform 110 may compare the feature data in the one or more images or an aggregate of the one or more images to one or more existing UPI feature sets of the plants in the grow facility. The aggregate of the multiple images may include a set of aggregated images, derivative image data, and/or so forth. In various embodiments, the comparison may be performed when the domain of UPI feature sets and scene features are the same or when the domain of UPI feature sets differs from the domain of the features in the scene. In the latter case of different domains, a transformation may be applied to transform the features in one or more of the domains that are in the same domain. Accordingly, a sub-graph searching algorithm, a computer vision algorithm, or some other algorithm may be used for the comparison.

At block 606, the plant tracking platform 110 may identify plant growth change information for one or more plants associated with the one or more existing UPI feature sets based on comparison of feature data to the existing UPI feature sets of the plurality of plants in the grow facility. In various embodiments, a detected UPI feature set for a plant or a group of plants may still be matched to its prior UPI feature set from a last captured scene when the morphological distance is smaller than a distance threshold. Once matched, a previous UPI feature set data entry stored in a database for the plant or the group of plants with a new UPI feature set data entry, or the data entries may be combined in the database.

At block 608, the plant tracking platform 110 may determine whether the feature data includes new features that are not associated with the one or more existing UPI feature sets of the plurality of plants in the grow facility. At decision block 610, if the plant tracking platform 110 determines that there are new features ("yes" at decision block 610), the process 600 may proceed to block 612.

At block 612, the plant tracking platform 110 may extract one or more new UPI feature sets and associated metadata for the at least one of the one or more new plants or one or more new groups of plants from the new feature data. The features of a UPI feature set for a corresponding plant or a corresponding group of plants may be generated from explicit plant components, whole plants, or direct latent vectors, and/or other invariant plant traits. Such extraction may be performed to register the at least one of the one or more new plants or one or more new groups of plants for tracking by the plant tracking platform 110. In some embodiments, the plant tracking platform 110 may use user-defined heuristics, configurations, or preferences to properly register plants or groups of plants that align with the growing operations processes and practices regarding the life cycles of the plants. In some instances, groups of plants may be grouped together using temporal, spatial, and/or metadata information. In other embodiments, such extraction may be performed as a part of manual plant group registration or computer-assisted plant group registration.

At block 614, the plant tracking platform 110 may store the one or more new UPI feature sets and the associated metadata to register the at least one of the one or more new plants or one or more new groups of plants. Accordingly, such information may enable the plant tracking platform 110 to track the at least one of the one or more new plants or one or more new groups of plants over time.

At block 616, the plant tracking platform 110 may provide an annotated version of a scene image that includes one or more indicators that correspond to one or more UPI feature sets. In various embodiments, the plant tracking platform 110 may provide the annotated version to a client application on a client device for display by an application user interface. For example, an indicator may be a superimposed mask or a box that surrounds a plant or a group of plants. Returning to decision block 610, if the plant tracking platform 110 determines that there are no new features ("no" at decision block 610), the process 600 may proceed directly to block 616.

Figure 7:
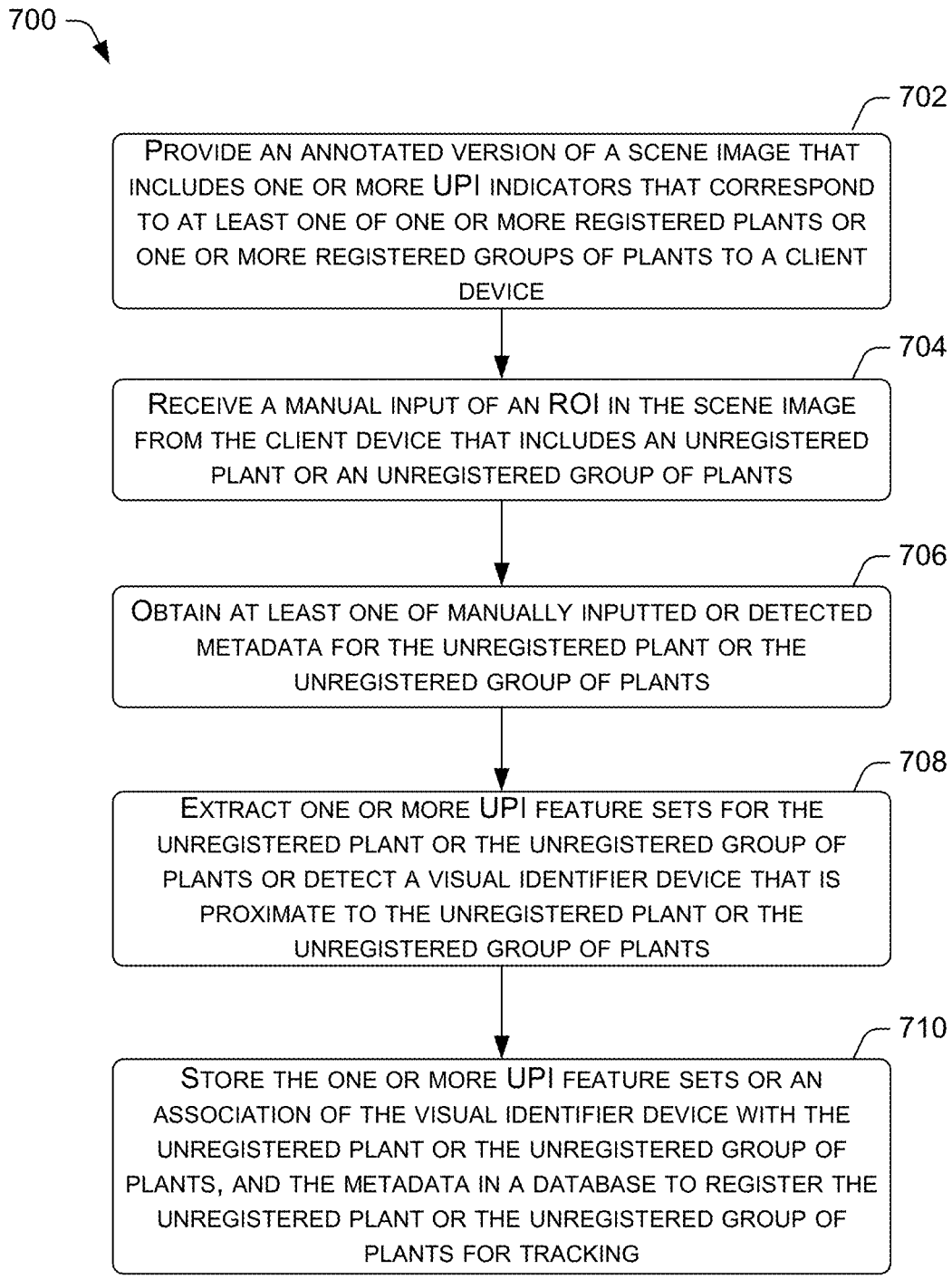
FIG. 7 is a flow diagram of an example process for manually registering plants for tracking based on image feature data via an input of a region of interest.

FIG. 7 is a flow diagram of an example process 700 for manually registering plants for tracking via an input of a region of interest. The example process 700 may provide further details regarding the registration described in block 302 of the process 300. At block 702, the plant tracking platform 110 may provide an annotated version of a scene image that includes multiple UPI indicators that correspond to at least one of one or more registered plants or one or more registered groups of plants to a client device. The scene image may include image feature data that is captured by one or more image sensors monitoring a grow facility. The plant tracking platform 110 may identify plants that are registered by comparing the image feature data to the one or more UPI feature sets of plants that are registered. In various embodiments, the plant tracking platform 110 may provide the annotated version of the scene image to a client application on the client device for display by an application user interface. For example, a UPI indicator may be a superimposed mask or a box that surrounds a plant or a group of plants.

At block 704, the plant tracking platform 110 may receive a manual input of an ROI in the scene image from the client device that includes an unregistered plant or an unregistered group of plants. In various embodiments, the ROI may be inputted using the application user interface by drawing boundaries, such as a box, a sphere, a free-hand outline, a polygon, etc. The drawing operation may be performed with a mouse, stylus, finger on a touch screen, etc.

At block 706, the plant tracking platform 110 may obtain at least one of manually inputted or detected metadata for the unregistered plant or the unregistered group of plants. The metadata may include species and/or variety of the individual plants or individual groups, growth time of the individual plants or individual groups, remaining time in the growth cycle of the individual plants or individual groups, growth start date and time of the individual plants or individual groups, expected growth cycle end date and time for the individual plants or individual groups, the progress of morphological change for the individual plants or individual groups, and/or so forth.

At block 708, the plant tracking platform 110 may extract one or more UPI feature sets for the unregistered plant or the unregistered group of plants or detect the visual identifier device that is proximate to the unregistered plant or the unregistered group of plants. The features of a UPI feature set for a corresponding plant or a corresponding group of plants may be generated from explicit plant components, whole plants, or direct latent vectors, and/or other invariant plant traits. For example, a single UPI feature set may be generated for all of the plants in the ROI, or a UPI feature set may be generated for each plant within the ROI, with a separate data structure being created that maps each of the UPI feature sets in the ROI to a single group of plants. At block 710, the plant tracking platform 110 may store the one or more UPI features sets or an association of the visual identifier device with the unregistered plant or the unregistered group of plants, and the metadata in a database to register the unregistered plant or the unregistered group of plants for tracking.

Figure 8:
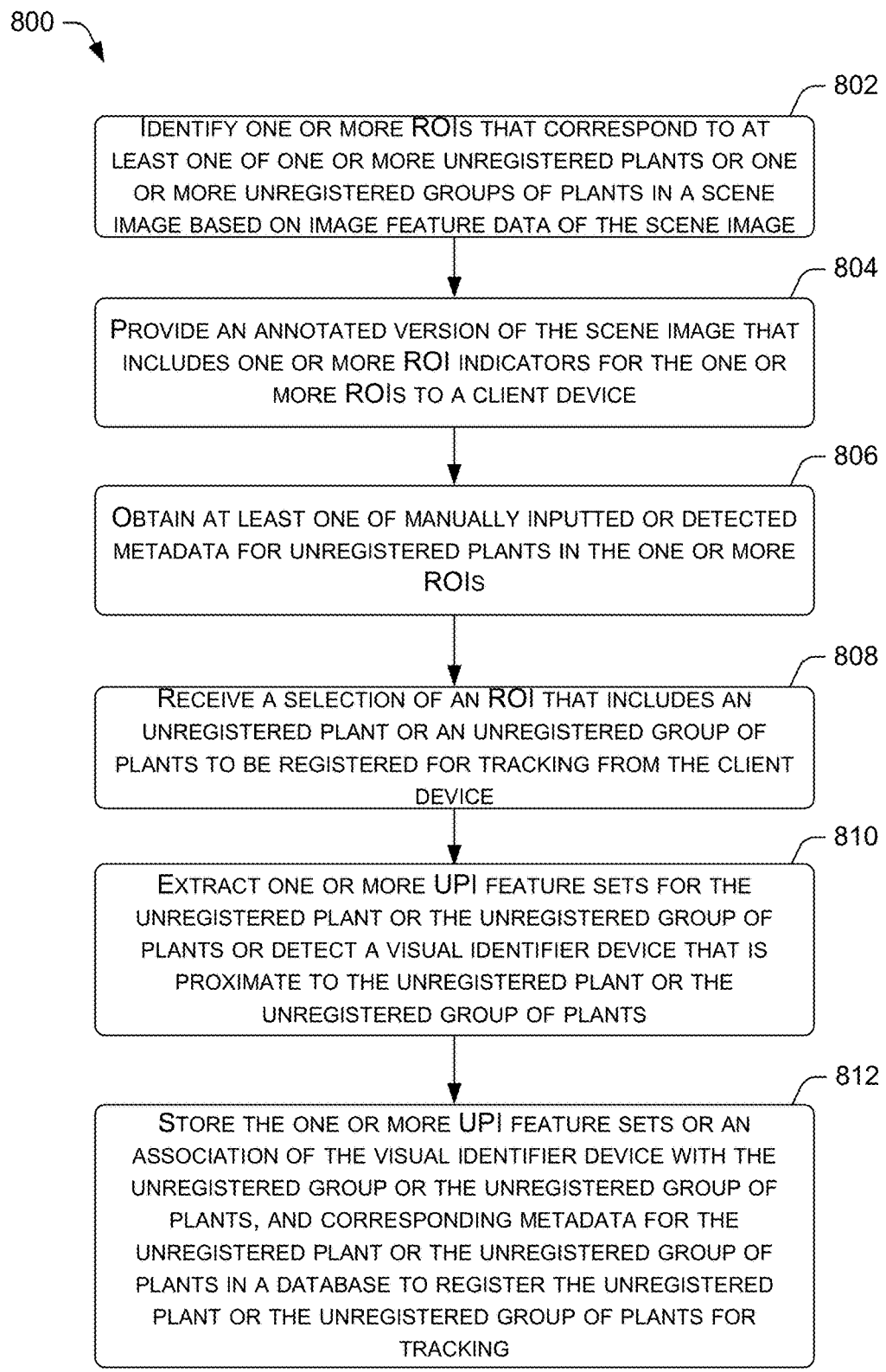
FIG. 8 is a flow diagram of an example process for performing plant registration based on automatic detection of ROIs with unregistered plants using image feature data and manual selections of ROIs.

FIG. 8 is a flow diagram of an example process 800 for performing a plant registration based on automatic detection of ROIs with unregistered plants using image feature data and manual selections of ROIs. The example process 800 may provide further details regarding the registration described in block 302 of the process 300. At block 802, the plant tracking platform 110 may identify one or more ROIs that correspond to at least one of one or more unregistered plants or one or more unregistered groups of plants in a scene image based on image feature data of the image. The scene image may include image feature data that is captured by one or more image sensors monitoring a grow facility. In various embodiments, a machine learning model, a computer vision algorithm, or some other classification algorithm may be used to generate plant-based scene features. The feature data is then used by the plant tracking platform 110 to identify one or more plants or one or more groups of plants without corresponding UPI feature sets as unregistered.

At block 804, the plant tracking platform 110 may provide an annotated version of the scene image that includes one or more ROI indicators for the one or more ROIs to a client device. In various embodiments, the plant tracking platform 110 may provide the annotated version to a client application on a client device for display by an application user interface. For example, an ROI indicator may be a superimposed mask or a box that surrounds a plant or a group of plants.

At block 806, the plant tracking platform 110 may obtain at least one of manually inputted or detected metadata for unregistered plants in the one or more ROIs. In various embodiments, a computer vision algorithm, or some other classification algorithm, may be used to automatically detect metadata attributes within the ROI, such as species, variety, start date and time information, and/or so forth.

At block 808, the plant tracking platform may receive a selection of an ROI that includes an unregistered plant or an unregistered group of plants to be registered for tracking from the client device. In various embodiments, a user may select an ROI via the application user interface of the client application on the client device.

At block 810, the plant tracking platform 110 may extract one or more UPI feature sets for the unregistered plant or the unregistered group of plants in the ROI or detect a visual identifier device that is proximate to the unregistered plant or the unregistered group of plants. The features of a UPI feature set for a corresponding plant or a corresponding group of plants may be generated from explicit plant components, whole plants, or direct latent vectors, and/or other invariant plant traits. For example, a single UPI feature set may be generated for all of the plants in the ROI, or a UPI feature set may be generated for each plant within the ROI, with a separate data structure being created that maps each of the UPI feature sets in the ROI to a single group of plants.

At block 812, the plant tracking platform 110 may store the one or more UPI feature sets or an association of the visual device identifier with the unregistered plant or the unregistered group of plants, and corresponding metadata for the unregistered plant or the unregistered group of plants in a database to register the unregistered plant or the unregistered group of plants for tracking. In this way, the plant tracking platform 110 may use the one or more UPI feature sets and the corresponding metadata to track the newly registered plant or group of plants.

Figure 9:
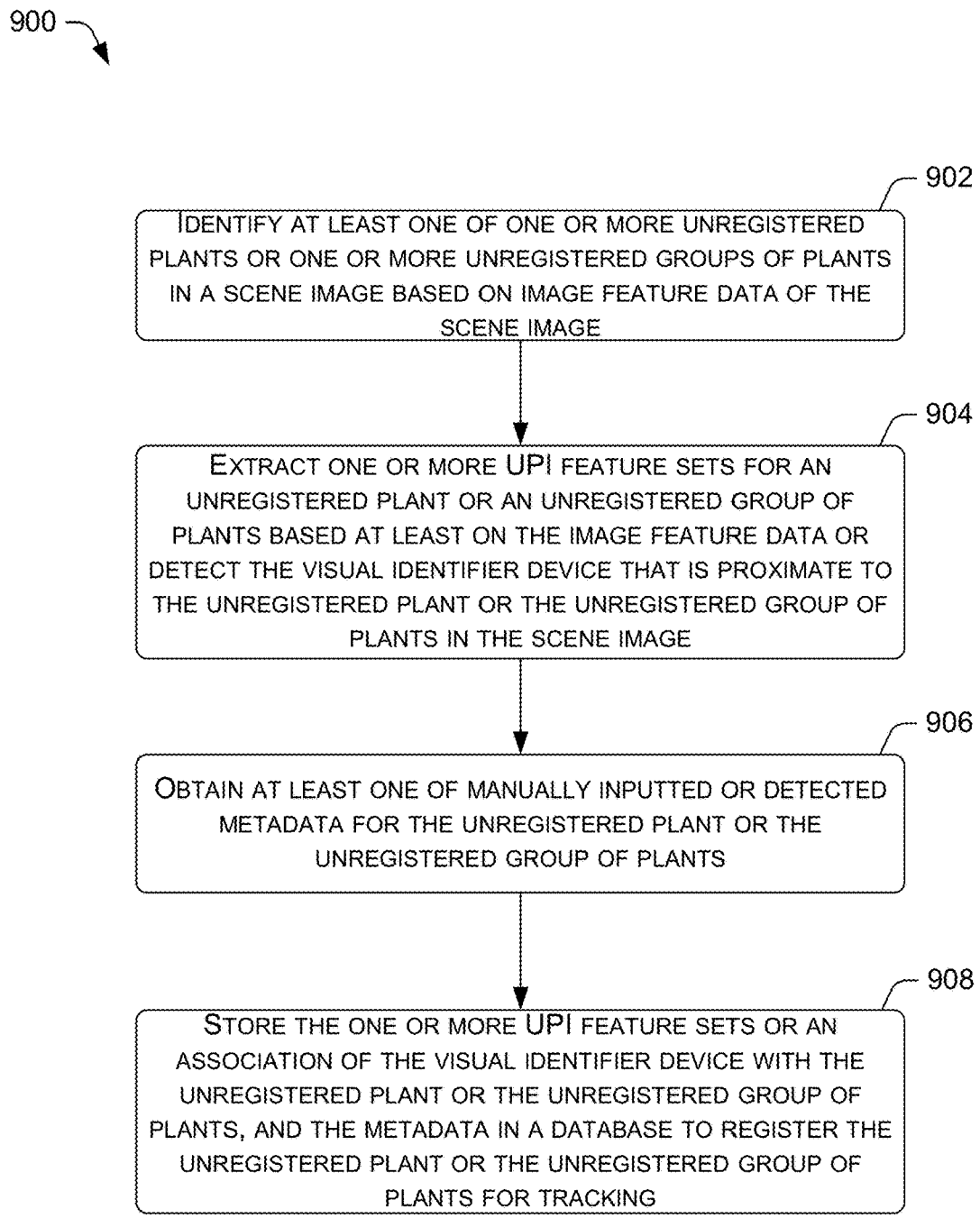
FIG. 9 is a flow diagram of an example process for performing plant registration based on automatic detection of ROIs with unregistered plants using image feature data.

FIG. 9 is a flow diagram of an example process 900 for performing a plant registration based on automatic detection of ROIs with unregistered plants using image feature data. The example process 900 may provide further details regarding the registration described in block 302 of the process 300. At block 902, the plant tracking platform 110 may identify at least one of one or more unregistered plants or one or more unregistered group of plants in a scene image based on image feature data of the scene image. The scene image may include image feature data that is captured by one or more image sensors monitoring a grow facility. In various embodiments, a machine learning model, a computer vision algorithm, or some other classification algorithm may be used to generate plant-based scene features. The feature data is then used by the plant tracking platform 110 to identify one or more plants or one or more groups of plants without corresponding UPI feature sets as unregistered.

At block 904, the plant tracking platform 110 may extract one or more UPI feature sets for an unregistered plant or an unregistered group of plants based on the image feature data or detect a visual identifier device that is proximate to the unregistered plant or the unregistered group of plants. The features of a UPI feature set for a corresponding plant or a corresponding group of plants may be generated from explicit plant components, whole plants, or direct latent vectors, and/or other invariant plant traits.

At block 906, the plant tracking platform 110 may obtain at least one of manually inputted or detected metadata for the unregistered plant or the unregistered group of plants. In various embodiments, a computer vision algorithm, or some other classification algorithm, may be used to automatically detect metadata attributes within the ROI, such as species, variety, start date and time information, and/or so forth.

At block 908, the plant tracking platform 110 may store the one or more UPI feature sets or an association of the visual device identifier device with the unregistered plant or the unregistered group of plants, and the metadata in a database to register the unregistered plant or the unregistered group of plants for tracking.

Figure 10:
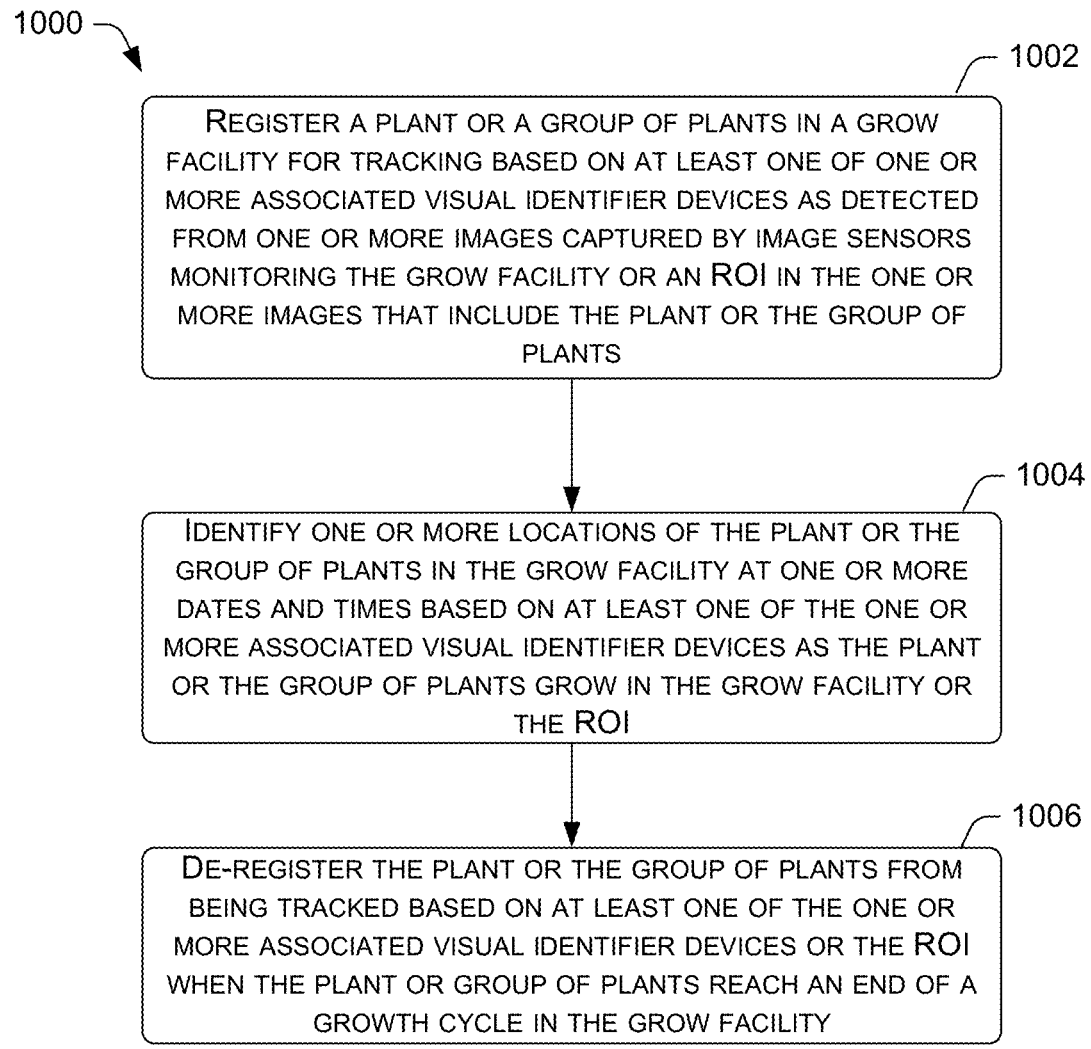
FIG. 10 is a flow diagram of an example process for using visual identifier devices associated with plants to track the plants during the grow operation of the plants.

FIG. 10 is a flow diagram of an example process 1000 for using visual identifier devices associated with plants to track the plants during the grow operation of the plants. At block 1002, the plant tracking platform 110 may register a plant or a group of plants in a grow facility for tracking based on at least one of one or more associated visual identifier devices as detected from one or more images captured by image sensors monitoring the grow facility or an ROI in the one or more images that include the plant or the group of plants. In various embodiments, the use of visual identifier devices to register a plant for a group of plants may be performed such that the plant tracking platform 110 may track the registered plant or the registered group of plants.

At block 1004, the plant tracking platform 110 may identify one or more locations of the plant or the group of plants in the grow facility at one or more dates and times based on at least one of the one or more associated visual identifier devices as the plant or the group of plants grow in the grow facility or the ROI. For example, a user may submit a request for information on a particular plant or group of plants via an application user interface of a client application on a client device at a particular date and time. In turn, information such as a current location of the particular plant or group in the grow facility may be provided for presentation by the application user interface. Other information provided may include species and/or variety of the particular plant or group, a current location of the particular plant or group in the grow facility, growth time of the particular plant or group, remaining time in the growth cycle of the particular plant or group, growth start date and time of the particular plant or group, expected growth cycle end date and time for the particular plant or group, the progress of morphological change for the particular plant or group, and/or so forth. The correspond UPI feature set may be further extracted from one or more additional images captured by the image sensors at various dates and times as the growth cycle continues.

At block 1006, the plant tracking platform 110 may de-register the plant or the group of plants from being tracked based on at least one of the one or more associated visual identifier devices or the ROI when the plant or the group of plants reaches an end of a growth cycle in the grow facility. In some embodiments, the de-registration of a plant or a group of plants may be performed automatically by the plant tracking platform 110 when visual identifier devices associated with the plant for the group of plants is no longer visible or no longer visible for a predetermined period of time in the images captured by the image sensors 104. Alternatively, the plant tracking platform 110 may de-register a plant or a group of plants based on information manually inputted by the user via the client application 128 on the client device 126, such as a cancellation or a removal of the designation of the ROI. Thus, the registration for tracking, the tracking, and the de-registration of the plant or the group of plants from tracking may be performed using the one or more visual identifier devices, one or more ROIs, or a combination of both in various embodiments.

Figure 11:
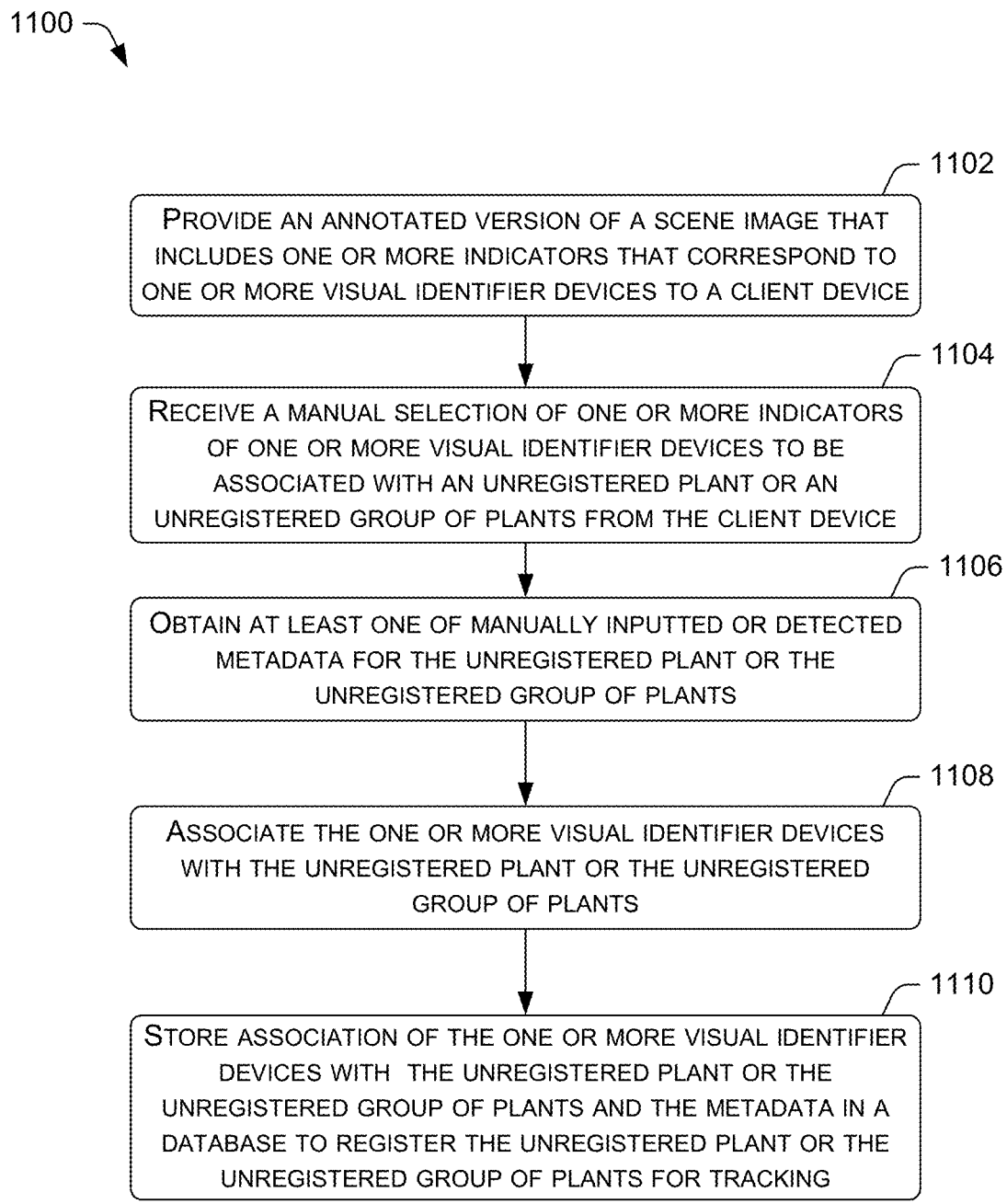
FIG. 11 is a flow diagram of an example process for manually registering plants for tracking based on visual identifier devices via an input of a region of interest.

FIG. 11 is a flow diagram of an example process 1100 for manually registering plants for tracking based on visual identifier devices via an input of a region of interest. The example process 1100 may provide further details regarding the registration described in block 1002 of the process 1000. At block 1102, the plant tracking platform 110 may provide an annotated version of a scene image that includes one or more indicators that correspond to one or more visual identifier devices to a client device. In various embodiments, the visual identifier devices may be placed at human-accessible boundaries, at or on a plant, at a column of one or more tables for growing plants, and/or so forth. Each indicator may be a superimposed symbol, legend, sign, and/or so forth that correlate with a location of a corresponding visual identifier device in the image.

At block 1104, the plant tracking platform 110 may receive a manual selection of one or more indicators of one or more visual identifier devices to be associated with an unregistered plant or an unregistered group of plants from the client device. In various embodiments, the selection may be inputted using the application user interface by highlighting or tapping the one or more indications. The selection operation may be performed with a mouse, stylus, finger on a touch screen, etc.

At block 1106, the plant tracking platform 110 may obtain at least one of manually inputted or detected metadata for the unregistered plant or the unregistered group of plants. The metadata may include species and/or variety of the individual plants or individual groups, growth time of the individual plants or individual groups, remaining time in the growth cycle of the individual plants or individual groups, growth start date and time of the individual plants or individual groups, expected growth cycle end date and time for the individual plants or individual groups, the progress of morphological change for the individual plants or individual groups, and/or so forth.

At block 1108, the plant tracking platform 110 may associate the one or more visual identifier devices with the unregistered plant or the unregistered group of plants. At block 1108, the plant tracking platform 110 may receive a manual input of metadata for the unregistered plant or the unregistered group of plants. For example, identification information of a visual identifier device (e.g., serial number, alphanumeric code, etc.) may be linked to a current location of the unregistered plant or the unregistered group of plants in the grow facility.

At block 1110, the plant tracking platform 110 may store association of the one or more visual identifier devices with the unregistered plant or the unregistered group of plants and the metadata in a database to register the unregistered plant or the unregistered group of plants for tracking. For example, identification information of a visual identifier device may be linked to the metadata for the unregistered plant or the unregistered group of plants for storage.

Figure 12:
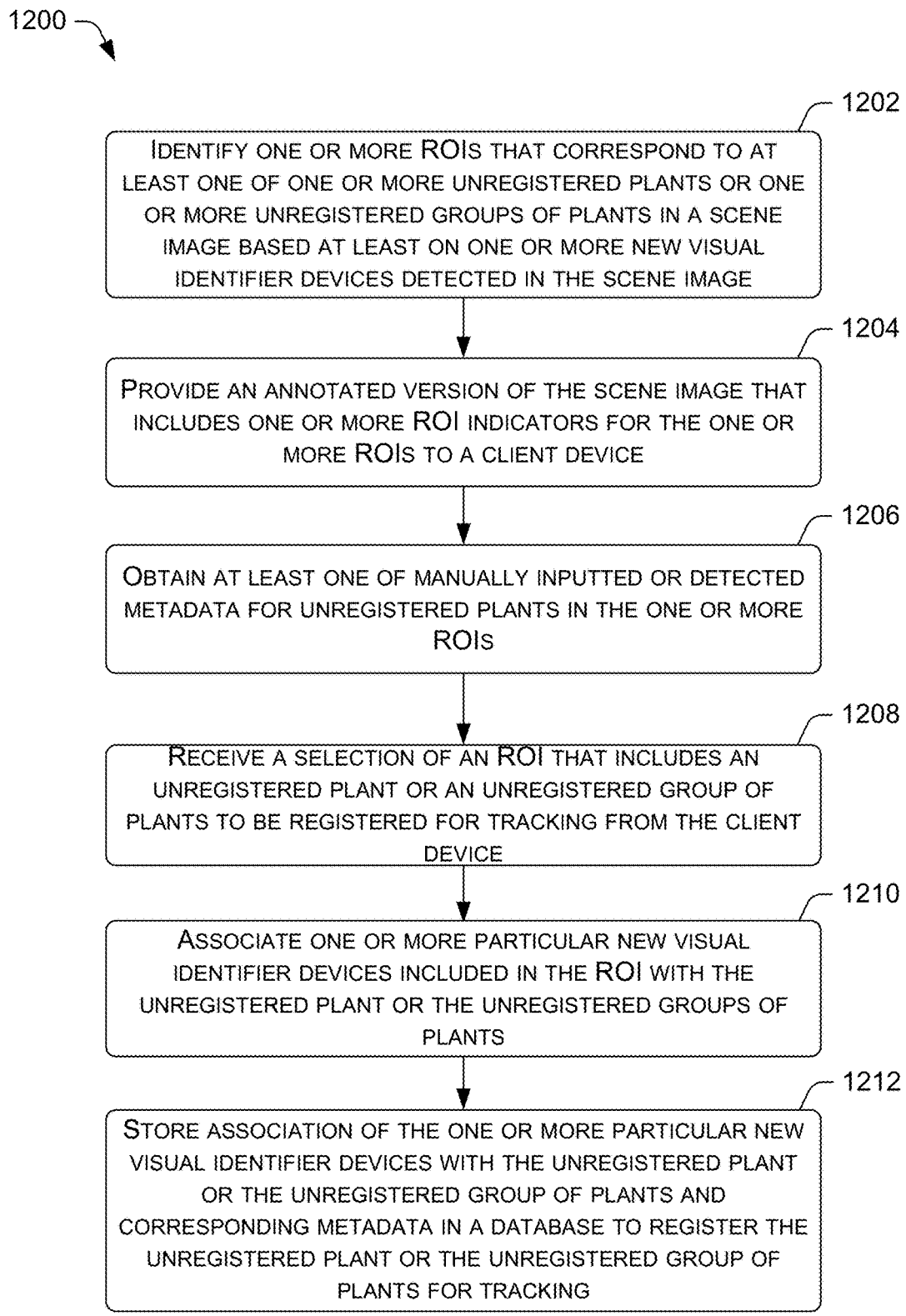
FIG. 12 is a flow diagram of an example process for performing a plant registration based on automatic detection of ROIs with unregistered plants using visual identifier devices and manual selections of ROIs.

FIG. 12 is a flow diagram of an example process 1200 for performing a plant registration based on automatic detection of ROIs with unregistered plants using visual identifier devices and manual selections of ROIs. The example process 1200 may provide further details regarding the registration described in block 1002 of the process 1000. At block 1202, the plant tracking platform 110 may identify one or more ROIs that correspond to at least one of one or more unregistered plants or one or more unregistered groups of plants in a scene image based at least on one or more new visual identifier devices detected in the scene image. The new visual identifier devices may be devices whose identification information is not found in an identifier database. In various embodiments, boundary-based group localization may be used to identify ROIs belonging to unregistered plants or unregistered plant groups within a scene image that are determined based on heuristic information as being identified by the new visual identifier devices.

At block 1204, the plant tracking platform 110 may provide an annotated version of the scene image that includes one or more ROI indicators for the one or more ROIs to a client device. In various embodiments, the plant tracking platform 110 may provide the annotated version to a client application on a client device for display by an application user interface. For example, an ROI indicator may be a superimposed mask or a box that surrounds a plant or a group of plants.

At block 1206, the plant tracking platform 110 may obtain at least one of manually inputted or detected metadata for unregistered plants in the one or more ROIs. In various embodiments, a computer vision algorithm, or some other classification algorithm, may be used to automatically detect metadata attributes within the ROI, such as species, variety, start date and time information, and/or so forth.

At block 1208, the plant tracking platform 110 may receive a selection of an ROI that includes an unregistered plant or an unregistered group of plants to be registered for tracking from the client device. In various embodiments, a user may select an ROI via the application user interface of the client application on the client device.

At block 1210, the plant tracking platform 110 may associate one or more particular new visual identifier devices included in the ROI with the unregistered plant or the unregistered group of plants. For example, identification information of a visual identifier device (e.g., serial number, alphanumeric code, etc.) may be linked to the metadata for the unregistered plant or the unregistered group of plants.

At block 1212, the plant tracking platform 110 may store association of the one or more particular new visual identifier devices with the unregistered plant or the unregistered group of plants and corresponding metadata in a database to register the unregistered plant or the unregistered group of plants for tracking.

Figure 13:
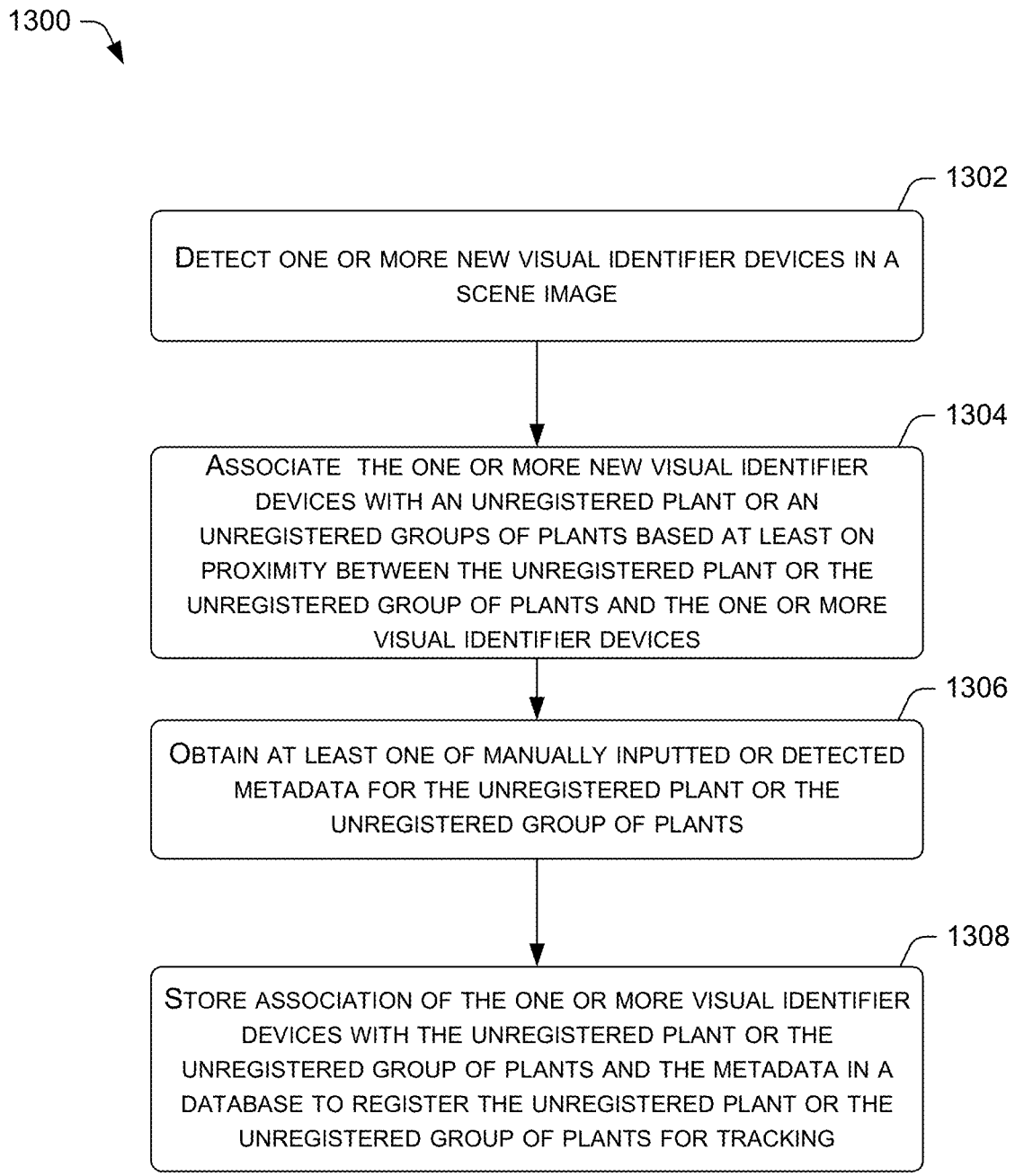
FIG. 13 is a flow diagram of an example process for performing plant registration based on automatic detection of ROIs with unregistered plants using visual identifier devices.

FIG. 13 is a flow diagram of an example process 1300 for performing plant registration based on automatic detection of ROIs with unregistered plants using visual identifier devices. The example process 1300 may provide further details regarding the registration described in block 1002 of the process 1000. At block 1302, the plant tracking platform 110 may detect one or more new visual identifier devices in a scene image. The new visual identifier devices may be devices whose identification information is not found in an identifier database.

At block 1304, the plant tracking platform 110 may associate the one or more new visual identifier devices with an unregistered plant or an unregistered group of plants based at least on proximity between the unregistered plant or the unregistered group of plants and the one or more visual identifier devices. For example, using heuristic information and/or spatial information of the visual identifier devices, the one or more new visual identifier devices may be grouped with the unregistered plant or the unregistered groups of plants. For example, identification information of a visual identifier device (e.g., serial number, alphanumeric code, etc.) may be linked to a current location of the unregistered plant or the unregistered group of plants in the grow facility.

At block 1306, the plant tracking platform 110 may obtain at least one of manually inputted or detected metadata for the unregistered plant or the unregistered group of plants. In various embodiments, a computer vision algorithm, or some other classification algorithm, may be used to automatically detect metadata attributes for the unregistered plant or the unregistered groups of plants, such as species, variety, start date and time information, and/or so forth.

At block 1308, the plant tracking platform 110 may store association of the one or more visual identifier devices with the unregistered plant or the unregistered group of plants and the metadata in a database to register the unregistered plant or the unregistered group of plants for tracking. For example, identification information of a visual identifier device may be linked to the metadata for the unregistered plant or the unregistered group of plants for storage.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   registering a plant or a group of plants in a grow facility for tracking based on a corresponding unique plant identifier (UPI) feature set as extracted from one or more images captured by a plurality of image sensors monitoring the grow facility or a corresponding visual identifier device detected from the one or more images as proximate to the plant or the group of plants;
   identifying one or more locations of the plant or the group of plants in the grow facility at one or more dates and times based on the corresponding UPI feature set or the corresponding visual identifier device as the plant or the group of plants grow in the grow facility; and
   de-registering the plant or the group of plants from being tracked based on the corresponding UPI feature set or the corresponding visual identifier device when the plant or the group of plants reaches an end of a growth cycle in the grow facility and when the corresponding UPI feature set or the corresponding visual identifier device of the plant or the group of plants is not observed in any new images captured by the plurality of image sensor for a predetermined time period.

2. The one or more non-transitory computer-readable media of claim 1, wherein the registering includes:
   capturing at least one image of plants in a grow facility at a particular date and time using the plurality of image sensors;
   analyzing one or more visual boundary cues in one or more images or an aggregate of multiple images via a computer algorithm to group the plants into at least one of one or more individual plants or one or more groups of plants;
   performing feature generation on plant components and associated attributes of the plants as captured in the one or more images or the aggregate to identify feature data of the plants;
   extracting the corresponding UPI feature set for at least the plant or the group of plants based at least on invariant features of the plants as included in the feature data; and
   storing the UPI feature set and associated metadata for the plant or the group of plants in a database for tracking.

3. The one or more non-transitory computer-readable media of claim 2, wherein corresponding plant components of a plant includes one or more of leaves, blades, petioles, stems, nodes, apical buds, stamens, carpels, flowers, apical buds, fingers, tap-roots, lateral roots, pistols, stigma, fruits, vines, or peduncles.

4. The one or more non-transitory computer-readable media of claim 3, wherein data of a plant component includes one or more of a position, an orientation, a shape descriptor, a classification, an instance identifier, a bounding volume, a feature vector of a particular dimension for the plant component.

5. The one or more non-transitory computer-readable media of claim 2, wherein the aggregate of the multiple images includes a stitched image of the multiple images, a 3-dimensional (3D) point cloud of the multiple images, an Orth mosaic of the multiple images, a 3D mesh of the multiple images, or a volumetric or surface neural rendering of a scene image that is derived from the multiple images.

6. The one or more non-transitory computer-readable media of claim 2, wherein corresponding metadata for a plant or a group of plants includes one or more of species, variety, growth time, remaining time in the growth cycle, growth start date and time, expected growth cycle end date and time, or progress of morphological change for the plant or the group of plants.

7. The one or more non-transitory computer-readable media of claim 1, wherein the registering includes:
   capturing at least one image of plants in a grow facility at a particular date and time using the plurality of image sensors;
   analyzing one or more visual boundary cues in one or more images or an aggregate of multiple images via a computer algorithm to group the plants into at least one of one or more individual plants or one or more groups of plants;
   detecting the corresponding visual identifier device that is proximate to the plant or the group of plants based on the at least one image of plants; and
   storing an association of the visual identifier device with the plant or the group of plants and associated metadata for the plant or the group of plants in a database for tracking.

8. The one or more non-transitory computer-readable media of claim 7, wherein the acts further comprise:
   determining whether the feature data includes new features that are not associated with the one or more existing UPI feature sets of the plurality of plants in the grow facility;
   in response to determining that the feature data includes new features that are not associated with the one or more existing UPI feature sets:
     extracting one or more new UPI feature sets and associated metadata for the at least one of one or more new plants or one or more new groups of plants from the new features; and
     storing the one or more new UPI feature sets and the associated metadata to register the at least one of the one or more new plants or the one or more new groups of plants for tracking.

9. The one or more non-transitory computer-readable media of claim 7, wherein the acts further comprise providing an annotated version of a scene image that includes one or more UPI indicators that correspond to one or more UPI feature sets to a client device.

10. The one or more non-transitory computer-readable media of claim 7, wherein the identifying includes identifying corresponding growth change information for a plant or a group of plants includes matching a newly extracted UPI feature set for the plant or the group of plants to an existing UPI feature set for the plant for the group of plants.

11. The one or more non-transitory computer-readable media of claim 1, wherein the acts further comprise:
receiving one or more images of a plurality of plants in the grow facility as captured by the plurality of image sensors;
comparing feature data in the one or more images or an aggregate of the one or more images to one or more existing UPI feature sets of the plants in the grow facility; and
identifying plant growth change information for one or more plants associated with one or more corresponding UPI feature sets based on comparison of feature data to the one or more existing UPI feature sets of the plurality of plants in the grow facility.

12. The one or more non-transitory computer-readable media of claim 1, wherein the identifying the one or more locations of the plant or the group of plants based on the corresponding visual identifier device includes associating the corresponding visual identifier device with the corresponding UPI feature set when the plant or the group of plants is initially registered for tracking based on the corresponding UPI feature set, and wherein the identifying the one or more locations of the plant or the group of plants based on the corresponding UPI feature set includes associating the corresponding UPI feature set with the corresponding visual identifier device when the plant or the group of plants is initially registered for tracking based on the visual identifier device.

13. The one or more non-transitory computer-readable media of claim 1, wherein the registering includes:
providing an annotated version of a scene image that includes one or more UPI indicators that correspond to at least one of one or more registered plants or one or more registered groups of plants to a client device, the scene image being an aggregate of a plurality of images;
receiving a manual input of a region of interest (ROI) in the scene image from the client device that includes an unregistered plant or an unregistered group of plants;
obtaining at least one of manually inputted or detected metadata for the unregistered plant or the unregistered group of plants;
extracting the UPI feature set for the unregistered plant or the unregistered group of plants or detecting the visual identifier device that is proximate to the unregistered plant or the unregistered group of plants; and
storing, the UPI feature set or an association of the visual identifier device with the unregistered plant or the unregistered group of plants, and the metadata in a database to register the unregistered plant or the unregistered group of plants for tracking.

14. The one or more non-transitory computer-readable media of claim 1, wherein the registering includes:
identifying one or more regions of interest (ROIs) that correspond to at least one of one or more unregistered plants or one or more unregistered groups of plants in a scene image based on image feature data of the scene image, the scene image being an aggregate of a plurality of images;
providing an annotated version of the scene image that includes one or more ROI indicators for the one or more ROIs to a client device;
obtaining at least one of manually inputted or detected metadata for unregistered plants in the one or more ROIs;
receiving a selection of an ROI that includes an unregistered plant or an unregistered group of plants to be registered for tracking from the client device;
extracting the UPI feature set for the unregistered plant or the unregistered group of plants or detecting the visual identifier device that is proximate to the unregistered plant or the unregistered group of plants; and
storing, the UPI feature sets or an association of the visual identifier device with the unregistered plant or the unregistered group of plant, and corresponding metadata for the unregistered plant or the unregistered group of plants in a database to register the unregistered plant or the unregistered group of plants for tracking.

15. The one or more non-transitory computer-readable media of claim 1, wherein the acts further comprise:
identifying at least one of one or more unregistered plants or one or more unregistered groups of plants in a scene image based on image feature data of the scene image, the scene image being an aggregate of a plurality of images;
extracting one or more UPI feature sets for an unregistered plant or an unregistered group of plants based at least on the image feature data or detecting the visual identifier device that is proximate to the unregistered plant or the unregistered group of plants in the scene image;
obtaining at least one of manually inputted or detected metadata for the unregistered plant or the unregistered group of plants; and
storing, the UPI feature set or an association of the visual identifier device with the unregistered plant or the unregistered group of plant, and the metadata in a database to register the unregistered plant or the unregistered group of plants for tracking.

16. A computer-implemented method, comprising:
registering, at one or more computing devices, a plant or a group of plants in a grow facility for tracking based on a corresponding unique plant identifier (UPI) feature set as extracted from one or more images captured by a plurality of image sensors monitoring the grow facility;
identifying, at the one or more computing devices, one or more locations of the plant or the group of plants in the grow facility at one or more dates and times based on the corresponding UPI feature set as the plant or the group of plants grow in the grow facility; and
de-registering, at the one or more computing devices, the plant or the group of plants from being tracked based on the corresponding UPI feature set when the corresponding UPI feature set of the plant or the group of plants is not observed in any new images captured by the plurality of image sensor for a predetermined time period.

17. A system, comprising:
one or more processors; and memory including a plurality of computer-executable components that are executable by the one or more processors to perform a plurality of actions, the plurality of actions comprising:
  registering a plant or a group of plants in a grow facility for tracking based on at least one of the one or more associated visual identifier devices as detected from one or more images captured by image sensors monitoring the grow facility or a region of interest (ROI) in the one or more images that include the plant or the group of plants;
  identifying one or more locations of the plant or the group of plants in the grow facility at one or more dates and times based on at least one of the one or more visual identifier devices or the ROI as the plant or the group of plants grow in the grow facility; and
  de-registering the plant or the group of plants from being tracked based on at least one of the one or more associated visual identifier devices or the ROI when the plant or the group of plants reaches an end of a growth cycle in the grow facility and when the at least one of the one or more associated visual identifier devices is not observed in any new images captured by the plurality of image sensor for a predetermined time period.

18. The system of claim 17, wherein the registering comprises:
  providing an annotated version of a scene image that includes one or more indicators that correspond to one or more visual identifier devices to a client device;
  receiving a manual selection of one or more indicators of one or more visual identifiers to be associated with an unregistered plant or an unregistered group of plants from the client device;
  obtaining at least one of manually inputted or detected metadata for the unregistered plant or the unregistered group of plants; and
  associating the one or more visual identifier devices with the unregistered plant or the unregistered group of plants and the metadata in a database to register the unregistered plant or the unregistered group of plants for tracking.

19. The system of claim 17, wherein the registering comprises:
  identifying one or more regions of interest (ROIs) that correspond to at least one of one or more unregistered plants or one or more unregistered groups of plants in a scene image based at least on one or more new visual identifier devices detected in the scene image, the scene image being an aggregate of a plurality of images;
  providing an annotated version of the scene image that includes one or more ROI indicators for the one or more ROIs to a client device;
  obtaining at least one of manually inputted or detected metadata for unregistered plants in the one or more ROIs;
  receiving a selection of a particular ROI that includes an unregistered plant or an unregistered group of plants to be registered for tracking from the client device;
  associating one or more particular new visual identifier devices included in the particular ROI with the unregistered plant or the unregistered group of plants; and
  storing association of the one or more particular new visual identifier devices with the unregistered plant or the unregistered group of plants and corresponding metadata in a database to register the unregistered plant or the unregistered group of plants for tracking.

20. The system of claim 17, wherein the registering comprises:
  detecting one or more new visual identifier devices in a scene image that is an aggregate of a plurality of images;
  associating the one or more new visual identifier devices with an unregistered plant or an unregistered group of plants based at least on proximity between the unregistered plant or the unregistered group of plants and the one or more visual identifier devices;
  obtaining at least one of manually inputted or detected metadata for the unregistered plant or the unregistered group of plants; and
  storing association of the one or more visual identifier devices with the unregistered plant or the unregistered group of plants and the metadata in a database to register the unregistered plant or the unregistered group of plants for tracking.

21. The system of claim 17, wherein the one or more associated visual identifier devices include a machine-readable code.

* * * * *